(12) United States Patent
Eriksson et al.

(10) Patent No.: US 12,147,631 B2
(45) Date of Patent: *Nov. 19, 2024

(54) USER INTERFACE

(71) Applicant: Neonode Inc., Stockholm (SE)

(72) Inventors: Björn Thomas Eriksson, Tynningö (SE); Sven Robert Pettersson, Huddinge (SE); Stefan Johannes Holmgren, Sollentuna (SE); Xiatao Wang, Lidingö (SE); Rozita Teymourzadeh, San Jose, CA (US); Per Erik Lindström, Årsta (SE); Emil Anders Braide, Årsta (SE); Jonas Daniel Justus Hjelm, Bandhagen (SE); Erik Anders Claes Rosengren, Stockholm (SE)

(73) Assignee: Neonode Inc., Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,826

(22) Filed: Aug. 15, 2023

(65) Prior Publication Data

US 2023/0384896 A1    Nov. 30, 2023

Related U.S. Application Data

(60) Continuation of application No. 17/176,033, filed on Feb. 15, 2021, now Pat. No. 11,782,557, which is a (Continued)

(51) Int. Cl.
*G06F 3/042* (2006.01)
*G06F 3/01* (2006.01)
(Continued)

(52) U.S. Cl.
CPC ............ *G06F 3/0421* (2013.01); *G06F 3/013* (2013.01); *G06F 3/017* (2013.01); *G06F 3/041* (2013.01);
(Continued)

(58) Field of Classification Search
CPC ..... G06F 3/013; G06F 3/041; G06F 2203/041
See application file for complete search history.

(56) References Cited

U.S. PATENT DOCUMENTS 11,782,557 B2 *  10/2023  Eriksson ................. G06F 3/017
                                                                345/175
2001/0030642 A1  10/2001  Sullivan et al.
(Continued)

FOREIGN PATENT DOCUMENTS

WO    2013102551 A1    7/2013

OTHER PUBLICATIONS

PCT Application No. PCT/US2020/067599, Search Report and Written Opinion, mailed on May 3, 2021, 14 pages.

*Primary Examiner* — Matthew A Eason
*Assistant Examiner* — Chayce R Bibbee
(74) *Attorney, Agent, or Firm* — Soquel Group, LLC

(57) ABSTRACT

A method for interacting with controls in a graphical user interface (GUI), including recording user interface gestures performed by a user, for each recorded gesture: when the gesture includes the user virtually touching a specific GUI control, applying the gesture to the specific GUI control; and when the gesture is performed without the user virtually touching a specific GUI control, identifying a particular GUI control that the user is gazing at and applying the gesture to that particular GUI control.

5 Claims, 18 Drawing Sheets

Related U.S. Application Data continuation of application No. 16/775,057, filed on Jan. 28, 2020, now Pat. No. 10,928,957, which is a continuation of application No. 15/616,106, filed on Jun. 7, 2017, now Pat. No. 10,585,530, which is a continuation-in-part of application No. 15/588,646, filed on May 7, 2017, now Pat. No. 10,282,034, which is a continuation-in-part of application No. 14/960,369, filed on Dec. 5, 2015, now Pat. No. 9,645,679, which is a continuation of application No. 14/588,462, filed on Jan. 2, 2015, now Pat. No. 9,207,800, said application No. 15/588,646 is a continuation-in-part of application No. 15/000,815, filed on Jan. 19, 2016, now Pat. No. 9,921,661, and a continuation-in-part of application No. 14/630,737, filed on Feb. 25, 2015, now abandoned, which is a continuation of application No. 14/140,635, filed on Dec. 26, 2013, now Pat. No. 9,001,087, which is a continuation of application No. 13/732,456, filed on Jan. 2, 2013, now Pat. No. 8,643,628, said application No. 15/000,815 is a continuation-in-part of application No. 14/726,533, filed on May 31, 2015, now Pat. No. 9,678,601, which is a continuation of application No. 14/311,366, filed on Jun. 23, 2014, now Pat. No. 9,063,614, which is a continuation of application No. PCT/US2014/040579, filed on Jun. 3, 2014, said application No. 15/000,815 is a continuation-in-part of application No. 14/791,414, filed on Jul. 4, 2015, now Pat. No. 10,324,565, said application No. 15/588,646 is a continuation-in-part of application No. 14/880,231, filed on Oct. 11, 2015, now Pat. No. 10,004,985, which is a division of application No. 14/312,787, filed on Jun. 24, 2014, now Pat. No. 9,164,625, which is a continuation-in-part of application No. 13/775,269, filed on Feb. 25, 2013, and a continuation-in-part of application No. PCT/US2014/040112, filed on May 30, 2014.

(60) Provisional application No. 62/348,179, filed on Jun. 10, 2016, provisional application No. 62/425,087, filed on Nov. 22, 2016, provisional application No. 62/462,034, filed on Feb. 22, 2017, provisional application No. 62/054,353, filed on Sep. 23, 2014, provisional application No. 62/107,536, filed on Jan. 26, 2015, provisional application No. 62/197,813, filed on Jul. 28, 2015, provisional application No. 62/266,011, filed on Dec. 11, 2015, provisional application No. 61/713,546, filed on Oct. 14, 2012, provisional application No. 61/846,089, filed on Jul. 15, 2013, provisional application No. 61/838,296, filed on Jun. 23, 2013, provisional application No. 61/828,713, filed on May 30, 2013, provisional application No. 61/986,341, filed on Apr. 30, 2014, provisional application No. 61/972,435, filed on Mar. 31, 2014, provisional application No. 61/929,992, filed on Jan. 22, 2014.

(51) Int. Cl.
*G06F 3/041* (2006.01)
*G09G 5/00* (2006.01)

(52) U.S. Cl.
CPC ............. *G06F 3/0412* (2013.01); *G09G 5/00* (2013.01); *G06F 2203/04103* (2013.01); *G06F 2203/04104* (2013.01)

(56) References Cited

U.S. PATENT DOCUMENTS

| | | |
|---|---|---|
| 2009/0198354 A1 | 8/2009 | Wilson |
| 2010/0066975 A1 | 3/2010 | Rehnstrom |
| 2013/0211843 A1 | 2/2013 | Clarkson |
| 2013/0057594 A1 | 3/2013 | Pryor |
| 2013/0261871 A1 | 10/2013 | Hobbs et al. |
| 2013/0271397 A1 | 10/2013 | MacDougall et al. |
| 2014/0292665 A1* | 10/2014 | Lathrop ................ G06F 3/0416 345/173 |
| 2014/0293226 A1 | 10/2014 | Hainzl et al. |
| 2014/0362206 A1 | 12/2014 | Kossin |
| 2015/0248796 A1 | 9/2015 | Iyer et al. |
| 2015/0355707 A1 | 12/2015 | Schindler et al. |
| 2017/0115825 A1 | 4/2017 | Eriksson et al. |
| 2017/0262134 A1 | 9/2017 | Eriksson et al. |
| 2018/0045827 A1 | 2/2018 | Yoon et al. |

\* cited by examiner

USER INTERFACE

CROSS REFERENCES TO RELATED APPLICATIONS

This application claims priority benefit from U.S. Provisional Application No. 62/348,179 entitled OPTICAL PROXIMITY SENSOR AND EYE TRACKER and filed on Jun. 10, 2016 by inventors Thomas Eriksson, Robert Pettersson, Stefan Holmgren, Xiatao Wang, Rozita Teymourzadeh, Per Erik Lindström, Emil Anders Braide, Jonas Daniel Justus Hjelm and Erik Rosengren.

This application is also a continuation-in-part of U.S. patent application Ser. No. 15/588,646 now U.S. Pat. No. 10,282,034, entitled TOUCH SENSITIVE CURVED AND FLEXIBLE DISPLAYS and filed on May 7, 2017 by inventors Thomas Eriksson, Alexander Jubner, Rozita Teymourzadeh, Stefan Holmgren, Lars Sparf, Bengt Henry Hjalmar Edlund and Richard Berglind.

U.S. patent application Ser. No. 15/588,646 claims priority benefit from:

- U.S. Provisional Patent Application No. 62/425,087 entitled OPTICAL PROXIMITY SENSOR AND ASSOCIATED USER INTERFACE and filed on Nov. 22, 2016 by inventors Thomas Eriksson, Alexander Jubner, Rozita Teymourzadeh, Stefan Holmgren, Lars Sparf and Bengt Henry Hjalmar Edlund; and
- U.S. Provisional Patent Application No. 62/462,034, entitled 3D IMAGING WITH OPTICAL PROXIMITY SENSOR and filed on Feb. 22, 2017 by inventors Thomas Eriksson, Alexander Jubner, Rozita Teymourzadeh, Stefan Holmgren, Lars Sparf, Bengt Henry Hjalmar Edlund.

U.S. patent application Ser. No. 15/588,646 is also a continuation-in-part of U.S. patent application Ser. No. 14/960,369, now U.S. Pat. No. 9,645,679, entitled INTEGRATED LIGHT GUIDE AND TOUCH SCREEN FRAME AND MULTI-TOUCH DETERMINATION METHOD and filed on Dec. 5, 2015 by inventors Thomas Eriksson, Alexander Jubner, John Karlsson, Lars Sparf, Saska Lindfors and Robert Pettersson.

U.S. patent application Ser. No. 14/960,369 is a continuation of U.S. patent application Ser. No. 14/588,462, now U.S. Pat. No. 9,207,800, entitled INTEGRATED LIGHT GUIDE AND TOUCH SCREEN FRAME AND MULTI-TOUCH DETERMINATION METHOD and filed on Jan. 2, 2015 by inventors Thomas Eriksson, Alexander Jubner, John Karlsson, Lars Sparf, Saska Lindfors and Robert Pettersson.

U.S. patent application Ser. No. 14/588,462 claims priority benefit from U.S. Provisional Patent Application No. 62/054,353 entitled INTEGRATED LIGHT GUIDE AND TOUCH SCREEN FRAME AND MULTI-TOUCH DETERMINATION METHOD and filed on Sep. 23, 2014 by inventors Saska Lindfors, Robert Pettersson, John Karlsson and Thomas Eriksson.

U.S. patent application Ser. No. 15/588,646 is also a continuation-in-part of U.S. patent application Ser. No. 15/000,815, now U.S. Pat. No. 9,921,661 entitled OPTICAL PROXIMITY SENSOR AND ASSOCIATED USER INTERFACE and filed on Jan. 19, 2016 by inventors Thomas Eriksson, Alexander Jubner, Rozita Teymourzadeh, Håkan Sven Erik Andersson, Per Rosengren, Xiatao Wang, Stefan Holmgren, Gunnar Martin Fröjdh, Simon Fellin, Jan Tomas Hartman, Oscar Sverud, Sangtaek Kim, Rasmus Dahl-Örn, Richard Berglind, Karl Erik Patrik Nordström, Lars Sparf, Erik Rosengren, John Karlsson, Remo Behdasht, Robin Kjell Åman, Joseph Shain, Oskar Hagberg and Joel Rozada.

U.S. patent application Ser. No. 15/000,815 claims priority benefit from:

- U.S. Provisional Application No. 62/107,536 entitled OPTICAL PROXIMITY SENSORS and filed on Jan. 26, 2015 by inventors Stefan Holmgren, Oscar Sverud, Sairam Iyer, Richard Berglind, Karl Erik Patrik Nördstrom, Lars Sparf, Per Rosengren, Erik Rosengren, John Karlsson, Thomas Eriksson, Alexander Jubner, Remo Behdasht, Simon Fellin, Robin Kjell Åman and Joseph Shain;
- U.S. Provisional Application No. 62/197,813 entitled OPTICAL PROXIMITY SENSOR and filed on Jul. 28, 2015 by inventors Rozita Teymourzadeh, Håkan Sven Erik Andersson, Per Rosengren, Xiatao Wang, Stefan Holmgren, Gunnar Martin Fröjdh and Simon Fellin; and
- U.S. Provisional Application No. 62/266,011 entitled OPTICAL PROXIMITY SENSOR and filed on Dec. 11, 2015 by inventors Thomas Eriksson, Alexander Jubner, Rozita Teymourzadeh, Håkan Sven Erik Andersson, Per Rosengren, Xiatao Wang, Stefan Holmgren, Gunnar Martin Fröjdh, Simon Fellin and Jan Tomas Hartman.

U.S. patent application Ser. No. 15/000,815 is also a continuation-in-part of U.S. patent application Ser. No. 14/630,737 entitled LIGHT-BASED PROXIMITY DETECTION SYSTEM AND USER INTERFACE and filed on Feb. 25, 2015 by inventors Thomas Eriksson and Stefan Holmgren.

U.S. patent application Ser. No. 14/630,737 is a continuation of U.S. patent application Ser. No. 14/140,635, now U.S. Pat. No. 9,001,087, entitled LIGHT-BASED PROXIMITY DETECTION SYSTEM AND USER INTERFACE and filed on Dec. 26, 2013 by inventors Thomas Eriksson and Stefan Holmgren.

U.S. patent application Ser. No. 14/140,635 is a continuation of U.S. patent application Ser. No. 13/732,456, now U.S. Pat. No. 8,643,628, entitled LIGHT-BASED PROXIMITY DETECTION SYSTEM AND USER INTERFACE and filed on Jan. 2, 2013 by inventors Thomas Eriksson and Stefan Holmgren.

U.S. patent application Ser. No. 13/732,456 claims priority benefit from U.S. Provisional Patent Application Ser. No. 61/713,546 entitled LIGHT-BASED PROXIMITY DETECTION SYSTEM AND USER INTERFACE and filed on Oct. 14, 2012 by inventor Stefan Holmgren.

U.S. patent application Ser. No. 15/000,815 is a continuation-in-part of U.S. patent application Ser. No. 14/726,533, now U.S. Pat. No. 9,678,601, entitled OPTICAL TOUCH SCREENS and filed on May 31, 2015 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

U.S. patent application Ser. No. 14/726,533 is a continuation of U.S. patent application Ser. No. 14/311,366, now U.S. Pat. No. 9,063,614, entitled OPTICAL TOUCH SCREENS and filed on Jun. 23, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

U.S. patent application Ser. No. 14/311,366 is a continuation of PCT Patent Application No. PCT/US14/40579, entitled OPTICAL TOUCH SCREENS and filed on Jun. 3, 2014 by inventors Robert Pettersson, Per Rosengren, Erik Rosengren, Stefan Holmgren, Lars Sparf, Richard Berglind, Thomas Eriksson, Karl Erik Patrik Nordstrom, Gunnar Martin Fröjdh, Xiatao Wang and Remo Behdasht.

U.S. patent application Ser. No. 15/000,815 is also a continuation-in-part of U.S. patent application Ser. No. 14/555,731, now U.S. Pat. No. 9,741,184, entitled DOOR HANDLE WITH OPTICAL PROXIMITY SENSORS and filed on Nov. 28, 2014 by inventors Sairam Iyer, Stefan Holmgren and Per Rosengren.

U.S. patent application Ser. No. 15/000,815 is also a continuation-in-part of U.S. patent application Ser. No. 14/791,414, now U.S. Pat. No. 10,324,565, entitled OPTICAL PROXIMITY SENSOR FOR TOUCH SCREEN AND ASSOCIATED CALIBRATION TOOL and filed on Jul. 4, 2015 by inventors Per Rosengren, Xiatao Wang and Stefan Holmgren.

U.S. patent application Ser. No. 15/588,646 is also a continuation-in-part of U.S. patent application Ser. No. 14/880,231, now U.S. Pat. No. 10,004,985 entitled GAMING DEVICE and filed on Oct. 11, 2015 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

U.S. patent application Ser. No. 14/880,231 is a divisional of U.S. patent application Ser. No. 14/312,787, now U.S. Pat. No. 9,164,625, entitled OPTICAL PROXIMITY SENSORS and filed on Jun. 24, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

U.S. patent application Ser. No. 14/312,787 is a continuation-in-part of U.S. patent application Ser. No. 13/775,269, now U.S. Pat. No. 8,917,239, entitled REMOVABLE PROTECTIVE COVER WITH EMBEDDED PROXIMITY SENSORS and filed on Feb. 25, 2013 by inventors Thomas Eriksson, Stefan Holmgren, John Karlsson, Remo Behdasht, Erik Rosengren and Lars Sparf.

U.S. patent application Ser. No. 14/312,787 is also a continuation of PCT Application No. PCT/US14/40112, entitled OPTICAL PROXIMITY SENSORS and filed on May 30, 2014 by inventors Stefan Holmgren, Sairam Iyer, Richard Berglind, Karl Erik Patrik Nordström, Lars Sparf, Per Rosengren, Erik Rosengren, John Karlsson, Thomas Eriksson, Alexander Jubner, Remo Behdasht, Simon Fellin, Robin Åman and Joseph Shain.

PCT Application No. PCT/US14/40112 claims priority benefit from:

- U.S. Provisional Patent Application No. 61/986,341, entitled OPTICAL TOUCH SCREEN SYSTEMS and filed on Apr. 30, 2014 by inventors Sairam Iyer, Karl Erik Patrik Nordström, Lars Sparf, Per Rosengren, Erik Rosengren, Thomas Eriksson, Alexander Jubner and Joseph Shain;
- U.S. Provisional Patent Application No. 61/972,435, entitled OPTICAL TOUCH SCREEN SYSTEMS and filed on Mar. 31, 2014 by inventors Sairam Iyer, Karl Erik Patrik Nordström, Lars Sparf, Per Rosengren, Erik Rosengren, Thomas Eriksson, Alexander Jubner and Joseph Shain;
- U.S. Provisional Patent Application No. 61/929,992, entitled CLOUD GAMING USER INTERFACE and filed on Jan. 22, 2014 by inventors Thomas Eriksson, Stefan Holmgren, John Karlsson, Remo Behdasht, Erik Rosengren, Lars Sparf and Alexander Jubner;
- U.S. Provisional Patent Application No. 61/846,089 entitled PROXIMITY SENSOR FOR LAPTOP COMPUTER AND ASSOCIATED USER INTERFACE and filed on Jul. 15, 2013 by inventors Richard Berglind, Thomas Eriksson, Simon Fellin, Per Rosengren, Lars Sparf, Erik Rosengren, Joseph Shain, Stefan Holmgren, John Karlsson and Remo Behdasht;
- U.S. Provisional Patent Application No. 61/838,296 entitled OPTICAL GAME ACCESSORIES USING REFLECTED LIGHT and filed on Jun. 23, 2013 by inventors Per Rosengren, Lars Sparf, Erik Rosengren, Thomas Eriksson, Joseph Shain, Stefan Holmgren, John Karlsson and Remo Behdasht; and
- U.S. Provisional Patent Application No. 61/828,713 entitled OPTICAL TOUCH SCREEN SYSTEMS USING REFLECTED LIGHT and filed on May 2013 by inventors Per Rosengren, Lars Sparf, Erik Rosengren and Thomas Eriksson.

The contents of these applications are hereby incorporated by reference in their entireties.

FIELD OF THE INVENTION

The field of the present invention is light-based touch screens and proximity sensors and eye-tracking devices.

BACKGROUND OF THE INVENTION

In the prior art, a one-dimensional array of proximity sensors is not accurate enough to determine a two-dimensional location of a pointer within a two-dimensional plane extending from the array.

Laptop computers are typically available in touch screen and non-touch screen versions. It would be advantageous to enable consumers of non-touch screen laptops to enable touch screen functionality when desired. For example, it would be advantageous to enable swipe, pinch and rotate gestures when browsing images or checking a newsfeed. Another example is to enable touch screen functionality in specific situations, e.g., when using a laptop on a drop-down tray table that is so close to the user, it is more comfortable to use one's fingers to touch the screen than to use the laptop's built-in trackpad. It would also be advantageous to provide more intuitive user interfaces that track the user's focus of attention.

SUMMARY

There is provided in accordance with an embodiment of the present invention a user interface system, including a display surface displaying thereon a plurality of controls representing different applications, a multi-faceted housing situated along a single edge of the display surface, including an eye tracker mounted in a first facet of the housing, the first facet being distal from the display surface, the eye tracker identifying a control on the display surface at which a user's eyes are directed, and a proximity sensor mounted in a second facet of the housing, the second facet being between the first facet and the display, the proximity sensor detecting a gesture performed by an object opposite the second facet, and a processor running the different applications, connected to the proximity sensor and to the eye tracker, causing the application represented by the control identified by the eye tracker to receive as input the gesture detected by the proximity sensor.

There is additionally provided in accordance with an embodiment of the present invention a single straight bar, including an eye tracker identifying a location on the display at which a user's eyes are directed, when the user is gazing at the display, a proximity sensor detecting a gesture performed by an object in a detection plane that forms an acute angle with the direction of the user's gaze, means for repeatedly attaching the bar to and detaching the bar from an exterior housing of a computer display, and a communication port through which the identified location and the detected gesture are transmitted to a processor running different applications, each application having an associated control displayed on the computer display, wherein the processor in turn provides an input based on the gesture detected by the proximity sensor, to the application associated with the control that is displayed at the location identified by the eye tracker.

In certain embodiments, the eye tracker includes a plurality of first vertical-cavity surface-emitting lasers (VCSELs) mounted in the housing such that each first VCSEL illuminates a different section of the airspace opposite the housing, at least two camera sensors mounted in the housing receiving light emitted by the VCSELs reflected by the user, and outputting images thereof, an image processor receiving the output images from the camera sensors, identifying a location on the display surface at which the user's eyes are directed, and identifying the VCSELs that illuminated the user's eyes, and an activation unit receiving the image processor outputs, selectively activating the VCSELs identified by the image processor, wherein the image processor and the activating unit iteratively repeat the identifying a location, the identifying the VCSELs, and the selectively activating.

In certain embodiments, the proximity sensor includes a linear array of interlaced second VCSELs and photodiode detectors mounted on a printed circuit board such that each of the second VCSELs illuminates a different section of the airspace opposite the second facet of the housing, wherein the object reflects light, projected by the second VCSELs, back towards the photodiode detectors, and wherein the eye tracker activation unit synchronously activates the second VCSELs with the photodiode detectors only when the eye tracker VCSELs are not activated.

There is further provided in accordance with an embodiment of the present invention a proximity sensor for identifying a proximal object, including a housing, at least one light emitter mounted in the housing, each emitter operable when activated to project a light beam out of the housing, a plurality of light detectors mounted in the housing, each detector operable when activated to output a measure of an amount of light arriving at that detector, a plurality of lenses mounted in the housing, each lens, denoted L, being positioned in relation to a respective one of the detectors, denoted D, such that light entering lens L is maximally detected at detector D when the light enters lens L at an angle of incidence θ, and a processor connected to the emitters and to the detectors, operable to activate all of the detectors synchronously with activation of each emitter, the processor configured to calculate a location of a reflective object along a path of a light beam projected by an activated emitter, by (i) calculating an axis of symmetry with respect to which the outputs of the synchronously activated detectors are approximately symmetric, (ii) orienting the calculated axis of symmetry by the angle θ, and (iii) locating a point of intersection of the path of the emitted light beam with the oriented axis of symmetry.

In certain embodiments, the processor calculates the estimated axis of symmetry based on detector outputs surrounding a maximal detector output.

BRIEF DESCRIPTION OF THE DRAWINGS

The present invention will be more fully understood and appreciated from the following detailed description, taken in conjunction with the drawings in which.

The following table catalogs the numbered elements and lists the figures in which each numbered element appears. Similarly numbered elements represent elements of the same type, but they need not be identical elements.

| Numbered Elements | | |
|---|---|---|
| Element | Description | Figures |
| 100 | emitters | 3 |
| 101-110 | emitter | 6-10, 18 |
| 120 | emitter array | 1, 3, 5 |
| 200 | detectors | 3 |
| 201-211, 217 | detector | 6-10, 18 |
| 221, 222 | camera sensor | 1, 3, 5 |
| 302, 304-307, 316 | lens | 6-10, 18 |
| 400 | light beams | 1, 5 |
| 404, 409 | emitted light beam | 6-13, 18 |
| 404.01-404.23 (odd numbers after decimal point) | forward reflected light beam | 6, 8, 10-13, 18 |
| 404.04, 409.04 | backward reflected light beam | 7, 8 |
| 501 | proximity sensor | 1, 3, 5-9, 14, 18 |
| 502 | eye tracker | 1 |
| 601 | housing | 1, 3, 5 |
| 602 | keyboard | 5 |
| 603 | laptop computer | 5 |
| 701 | controller | 3, 6-9, 18 |
| 801 | display | 1, 5 |
| 802-804 | user interface control | 1, 5 |
| 901, 902 | shaft | 18 |
| 903 | motor | 18 |
| 904, 904.01-904.12, 905, 909 | hotspot location | 6-13 |
| 905 | reflective calibration object | 18 |
| 906 | arrow | 18 |
| 911 | reflective object | 6-9 |
| 912 | calculated location of object | 11-13 |
| 921-923 | axis of symmetry | 11-13 |
| 930-932 | time period | 4 |
| 940 | detection area | 14 |
| 1001-1009 | flowchart operation | 2 |

DETAILED DESCRIPTION

Figure 1:
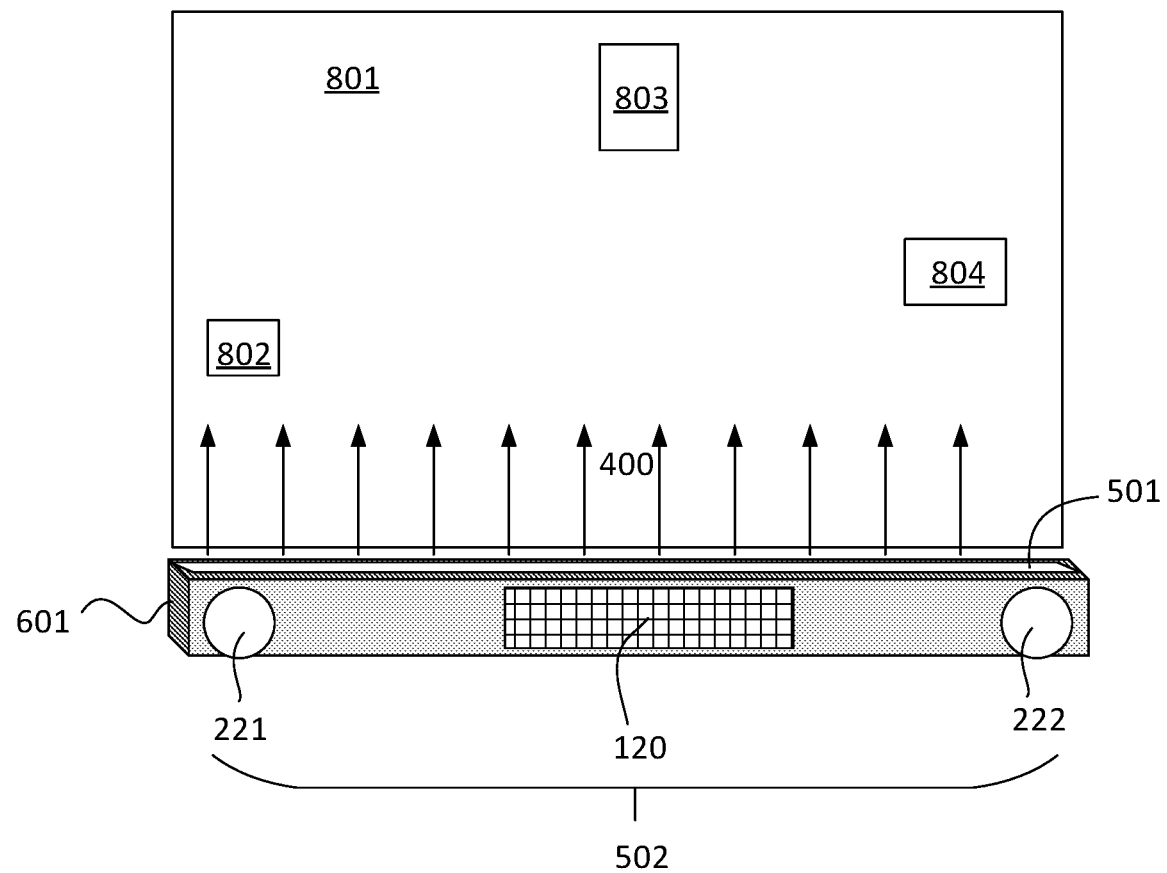
FIG. 1 is a simplified illustration of a combined eye tracker and gesture sensor, featuring a multi-faceted housing that includes an eye tracker mounted in a first facet of the housing and a proximity sensor mounted in a second facet of the housing adjacent the first facet, wherein the proximity sensor is oriented to detect gestures on a display, in accordance with an embodiment of the present invention.

Reference is made to FIG. 1, which is a simplified illustration of a combined eye tracker and gesture sensor, featuring a multi-faceted housing 601 that includes an eye tracker 502 mounted in a first facet of the housing and a proximity sensor 501 mounted in a second facet of the housing adjacent the first facet, wherein the proximity sensor is oriented to detect gestures on a display, in accordance with an embodiment of the present invention. Housing 601 is used with a PC or smart TV display 801 that presents controls 802-804 for activating tasks or applications, in accordance with an embodiment of the present invention. Proximity sensor 501 is operable to detect gestures performed by a reflective object on or near display 801. Eye tracker 502 is operable to identify a direction of a user's gaze and output that information to the PC or smart TV that maps that directional gaze to one of controls 802-804 on display 801. In certain embodiments of the invention, the task or application represented by that control receives as input the gesture detected by proximity sensor 501.

In FIG. 1, housing 601 is placed along the bottom edge of display 801. Proximity sensor 501 projects light beams 400 substantially parallel to the surface of display 801, through a facet of housing 601 facing display 801. When an object touches the surface of display 801, that object reflects a portion of beams 400 back towards proximity sensor 501. These reflected beams are detected by light detectors mounted in housing 601. Based on these detected reflected beams, touch gestures on display 801 are identified, as explained below.

Gesture detection data from proximity sensor 501 is transferred to the PC or smart TV in different formats according to how proximity sensor 501 is configured, and this configuration can be changed during operation of proximity sensor 501. In one mode, gesture detection data from proximity sensor 501 is transferred in Human Interface Device (HID) format for touch screens whereby the gesture coordinates are mapped to absolute screen coordinates. In another mode, gesture detection data from proximity sensor 501 is transferred in HID format for trackpads, whereby the gesture coordinates are relative coordinates, e.g., a slide left gesture moves a screen cursor left, regardless of where the gesture is detected in the proximity sensor detection zone. In another mode, gesture detection data from proximity sensor 501 is transferred in HID format for keyboards, whereby the gesture is interpreted into key presses, e.g., the detection area is mapped to a virtual keyboard such that tap gestures at different locations are transmitted as key presses of corresponding keys in the virtual keyboard, or a slide left gesture at the outer right edge of the screen is transmitted as the key-press combination Windows key+C which is the keyboard shortcut for opening the Charms bar in the Windows® operating system. WINDOWS is a registered trademark of Microsoft Corporation. In yet another mode, the detection signals are transmitted in a custom HID format which is read and interpreted by an application running on the PC or smart TV.

Proximity sensor 501 will change its mode of transmitting gesture data in response to detecting specific gestures or in response to configuration commands received from an application running on the PC or smart TV. For example, even when proximity sensor 501 is configured to output data in touch screen format, a sweep left gesture at the right edge of the screen is transmitted as the key-press combination Windows key+C. In some embodiments, when proximity sensor 501 is facing upwards, it is internally configured to output data in touch screen mode and when proximity sensor 501 is facing the user, it is internally configured to output data in trackpad mode or keyboard mode. Furthermore, when proximity sensor 501 is facing the user and attached to a display it is internally configured to output data in keyboard mode, as it is assumed that the detection area is directly above a keyboard, and when proximity sensor 501 is facing the user but detached from any display, it is internally configured to output data in trackpad mode, as it is assumed that the detection area is directly above a tabletop with no keypad indicia. In some embodiments, an accelerometer or orientation sensor is mounted in housing 601 to detect the direction proximity sensor 501 is facing.

Eye tracker 502 includes an array 120 of VCSELs that project infra-red light or near infra-red light, through an outward-facing facet of housing 601, adjacent the proximity sensor facet, towards the user of display 801. This light is reflected by the eye and captured by camera sensors 221 and 222 mounted along the outward-facing facet of housing 601.

The camera images are analyzed to extract eye rotation from changes in the captured reflections. In some embodiments of the invention the eye is identified by corneal reflection (the first Purkinje image) and the center of the pupil. In other embodiments, the eye is identified using reflections from the front of the cornea (first Purkinje image) and the back of the lens (fourth Purkinje image). In still other embodiments of the invention, features from inside the eye are tracked as the eye rotates, such as the retinal blood vessels.

By identifying the direction of the user's gaze toward display 801, the eye tracker enables the PC or smart TV to identify which of controls 802-804 the user is gazing at. Subsequent input actions such as taps, sweep gestures or spread gestures are then applied to the application or task corresponding to the thus identified control, regardless of where the input action is performed. For example, when the PC or smart TV identifies that the user is gazing at a scrollbar, subsequent slide gestures scroll the active document, and when the PC or smart TV identifies that the user is gazing at a volume slider control, subsequent slide gestures move the slider thumb to change the volume. This can be accomplished in several ways, inter alia, (1) by configuring proximity sensor 501 to output data in HID keyboard format and outputting an appropriate keyboard command to scroll the document or change the volume, (2) by configuring proximity sensor 501 to output data in HID trackpad format to move the slider thumb, or (3) by configuring proximity sensor 501 to output data in HID custom format and configuring the volume or document application to receive that data and interpret it. In some embodiments of the present invention, the control thus-identified by the PC or smart TV is enlarged, highlighted, or otherwise altered, to indicate to the user that subsequent input gestures will be applied to that control.

In some embodiments of the present invention, housing 601 includes a magnet for attaching and detaching housing 601 to a ferromagnetic exterior housing of a computer display or smart TV.

Figure 2:
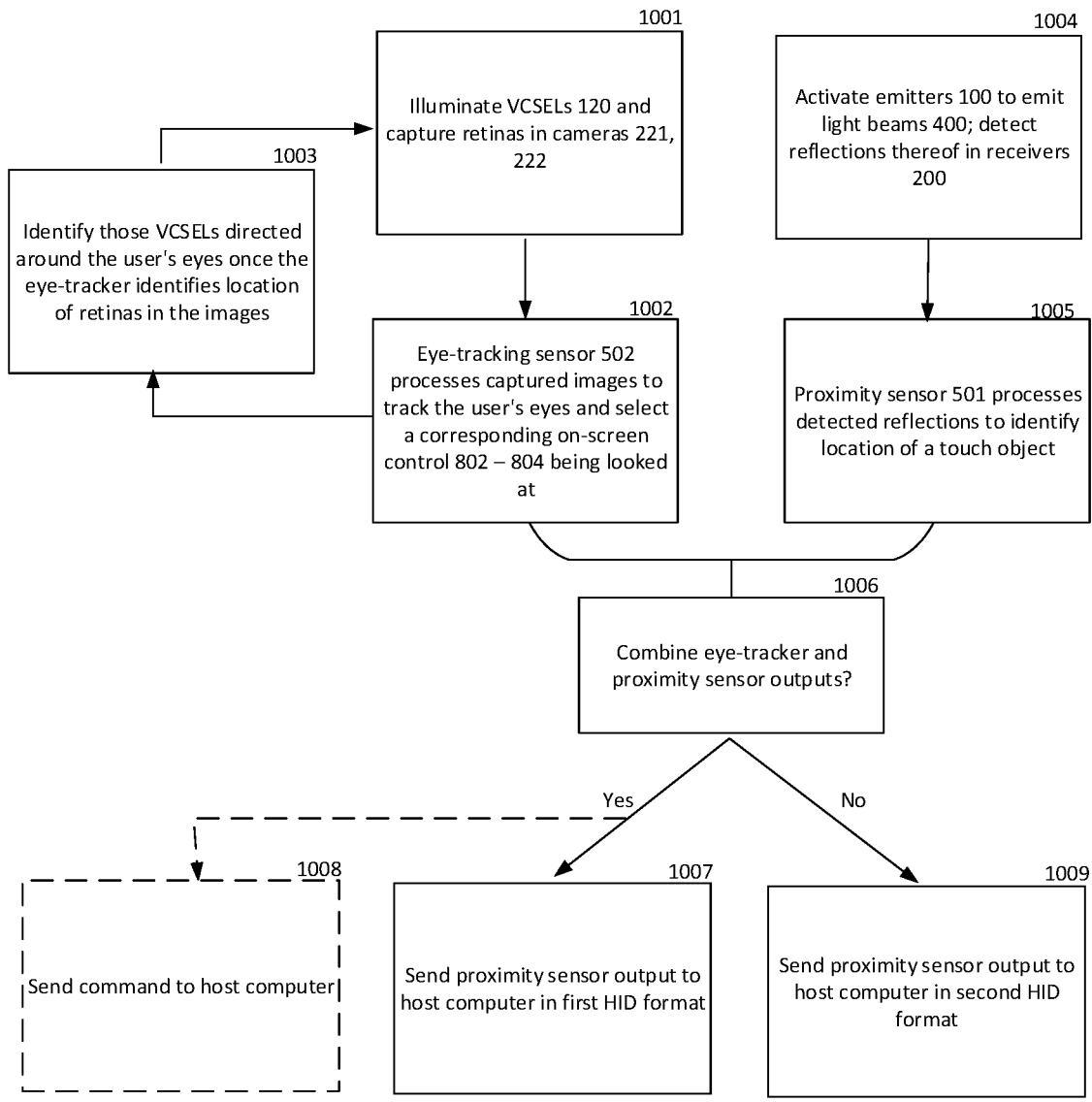
FIG. 2 is a simplified flow chart of a method for operating the combined proximity sensor and eye tracker of FIG. 1, in accordance with an embodiment of the present invention.

Reference is made to FIG. 2, which is a simplified flow chart of a method for operating the combined proximity sensor 501 and eye tracker 502 of FIG. 1, in accordance with an embodiment of the present invention. At operation 1001 the VCSELs in array 120 are activated and their reflections are captured by cameras 221 and 222. At operation 1002 the captured images are analyzed to extract the eye reflections as discussed hereinabove. In certain embodiments, the method further identifies, at operation 1003, which VCSELs in array 120 generated the retinal reflections and in a subsequent operation 1001, only those VCSELs identified at operation 1003 are activated. By tracking and activating only those VCSELs needed to generate retinal reflections, this system saves power.

In some embodiments of the invention, the VCSELs are activated individually, enabling the system to identify which VCSEL generated the retinal reflections. In other embodiments, multiple VCSELs are activated at once, but the area illuminated by each VCSEL within each captured image is known. Thus, the system is able to identify which VCSEL generated the retinal reflections by determining the location in the captured images at which the retinal reflections appear. Subsequently, only the identified VCSELs are activated. In some embodiments, VCSELs surrounding the thus-identified VCSEL are also activated at operations 1001. In some embodiments the VCSELs surrounding the thus-identified VCSEL are activated when retinal reflections are no longer captured by activating the identified VCSEL, as it is assumed that the retina has moved slightly from its previous location.

At operation 1004, emitters 100 and receivers 200 of proximity sensor 501 are activated, and at operation 1005 proximity sensor 501 processes the reflections detected by receivers 200 to identify the location of a touch object. By tracking the object's location over time, gestures are detected.

At operation 1006 a decision is taken by the PC or smart TV as to whether to combine the outputs of proximity sensor 501 and eye tracker 502. If the decision is affirmative, at operation 1007 the detected gesture is applied to the application or task corresponding to the control identified at operation 1002 by the PC or smart TV configuring proximity sensor 501 to output gesture data in an appropriate HID format. As discussed hereinabove, proximity sensor output can be configured as a specific command, e.g., as a key-press combination or in a custom format interpreted by the application. This is indicated by operation 1008. Conversely, if the decision is negative, at operation 1009 the proximity sensor data is output in a different format, e.g., in HID format for a touch screen device. In certain embodiments, proximity sensor 501 is only activated after eye tracker 502 identifies a control at which the user's gaze is directed and to which subsequent gestures will be applied. Furthermore, because the detected gesture is applied to the identified control, the gesture can be relative, rather than absolute; i.e., the gesture need not be performed on or near the identified control. This is similar to a computer mouse which can be placed anywhere to control a cursor on a screen. This provides freedom for user interface designers to provide controls that can be easily seen, but do not need to be easy to touch.

In embodiments of the present invention, gestures detected by proximity sensor 501 are transmitted to the host processor controlling the display in several different ways. A first case is where proximity sensor 501 detects touch gestures on the screen without reference to a control identified by eye tracker 502. In this case, proximity sensor 501 outputs x and y screen coordinates of the touch, e.g., output in HID format for a touch screen device. In a second case, proximity sensor 501 detects touch gestures on the screen with reference to a control identified by eye tracker 502. In this case, proximity sensor 501 outputs up-down motion or left-right motion of the touch object, but not the absolute x and y screen coordinates of the touch, e.g., output in HID format for a trackpad device. This is one difference between the present invention and prior art touch screen sensors, computer mice and computer trackpads, that always output touch data in the same format. Namely, prior art touch screen sensors always output absolute x and y screen coordinates of the touch in a first HID format, and computer mice and computer trackpads always output up-down motion or left-right motion of the touch object in a second HID format. In contrast, in embodiments of the present invention, the proximity sensor output format is dynamically configured in response to changing conditions.

Figure 3:
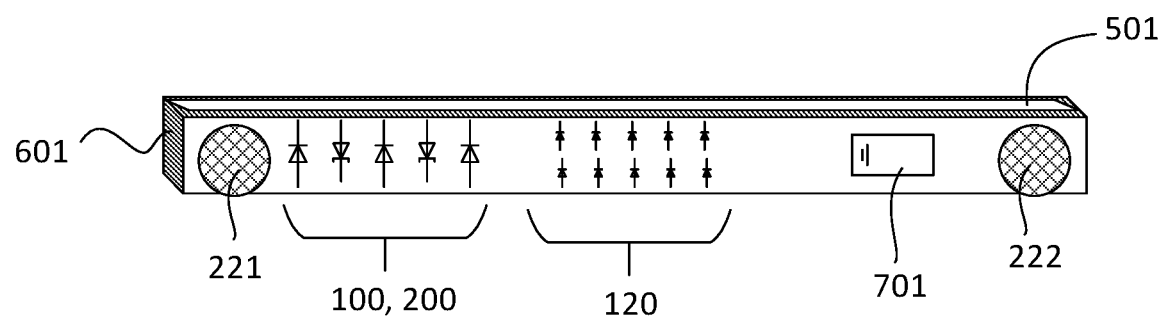
FIG. 3 is a simplified illustration of components in the combined proximity sensor and eye tracker of FIG. 1, in accordance with an embodiment of the present invention.

Reference is made to FIG. 3, which is a simplified illustration of components in the combined proximity sensor 501 and eye tracker 502 of FIG. 1, in accordance with an embodiment of the present invention. An alternating array of emitters 100 and detectors 200 is provided for proximity sensor 501; and an array of light emitters 120 and camera sensors 221 and 222 are provided for eye tracker 502. Emitters 100 and 120, detectors 200 and camera sensors 221 and 222 are synchronously activated by a single, shared controller 701. In some embodiments, emitters 100 are VCSELs.

Figure 4:
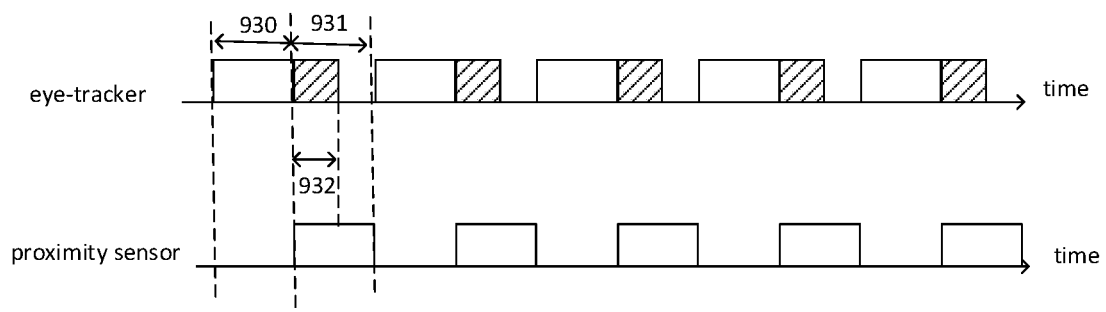
FIG. 4 is a simplified waveform illustrating how the eye tracker and proximity sensor are activated by a shared controller, in accordance with an embodiment of the present invention.

Reference is made to FIG. 4, which is a simplified waveform illustrating how the eye tracker 502 and proximity sensor 501 are activated by a shared controller 701, in accordance with an embodiment of the present invention. In particular, it is important that eye tracker VCSELs 120 are not activated while proximity sensor emitters 100 are activated, in order to avoid detections of the eye tracker light at proximity sensor receivers 200. For example, proximity sensor 501 takes a time interval 931 to complete a detection cycle, namely, to activate emitters 100 and detect reflections at receivers 200 and process the detections, and eye tracker 502 takes time interval 930 to capture images (illuminate VCSELs 120, capture images in cameras 220 and 221) and an additional time interval 932 to read out the image data and process the images. As illustrated in FIG. 4, time intervals 930 and 931 are kept separate, but time intervals 931 and 932 overlap.

Figure 5:
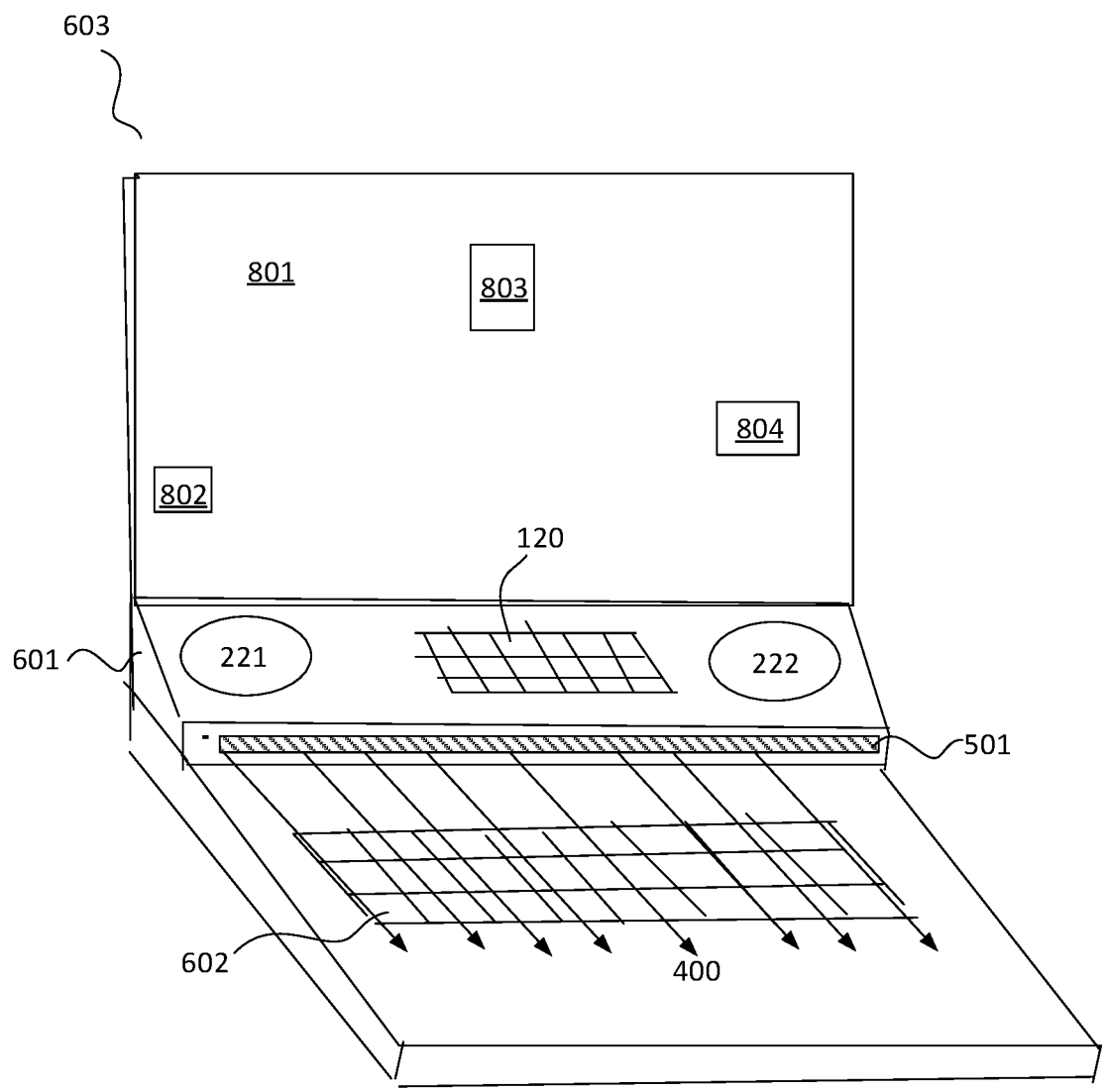
FIG. 5 is a simplified illustration of a combined eye tracker and gesture sensor, featuring a multi-faceted housing that includes an eye tracker mounted in a first facet of the housing and a proximity sensor mounted in a second facet of the housing adjacent the first facet, wherein the proximity sensor is oriented to detect gestures on a keyboard or surface in front of a display, in accordance with an embodiment of the present invention.

Reference is made to FIG. 5, which is a simplified illustration of a combined eye tracker and gesture sensor, including a multi-faceted housing that includes an eye tracker 502 mounted in a first facet of the housing and a proximity sensor 501 mounted in a second facet of the housing adjacent the first facet, wherein the proximity sensor is oriented to detect gestures on a keyboard or surface in front of a display, in accordance with an embodiment of the present invention. In contrast to the combined eye tracker and gesture sensor of FIG. 1, in which proximity sensor 501 is oriented to detect gestures on screen 801, in the combined eye tracker and gesture sensor of FIG. 5, proximity sensor 501 is oriented to detect gestures on a surface in front of the screen. FIG. 5 illustrates laptop computer 603 that includes display 801 connected by a hinge to a lower panel in which keyboard 602 is mounted. Proximity sensor light beams 400 are projected along a plane parallel to keyboard 602, and proximity sensor 501 detects gestures performed above the keys of keypad 602. Like the combined eye tracker and gesture sensor of FIG. 1, the combined eye tracker and gesture sensor of FIG. 5 combines gestures detected by proximity sensor 501 with outputs from eye tracker 502. When not combining gestures detected by proximity sensor 501 with outputs from eye tracker 502, the combined device outputs gestures detected by proximity sensor 501 to the host computer as up-down motion or left-right motion of the touch object, e.g., output in HID format for a trackpad device.

In other embodiments of the present invention, eye tracker 502 and proximity sensor 501 are located in separate housings, but their activations are coordinated and their outputs are combined by a shared PC or smart TV to which they are both connected.

Reference is made to FIGS. 6-9, which are simplified illustrations of proximity sensor 501, in accordance with an embodiment of the present invention. Proximity sensor 501 includes light emitters 101-110 and light detectors 201-211, each light emitter being situated between two of the detectors. Proximity sensor 501 also includes a plurality of lenses, such as lenses 302, 306 and 307, each lens being positioned in relation to two respective neighboring ones of the detectors such that light entering that lens is maximally detected at a first of the two detectors when the light enters that lens at an acute angle of incidence θ1, and light entering that lens is maximally detected at the other of the two detectors when the light enters that lens at an obtuse angle of incidence θ2. The lens is positioned in relation to the light emitter situated between these two detectors such that the light from the emitter is collimated as it exits proximity sensor 501.

Figure 6:
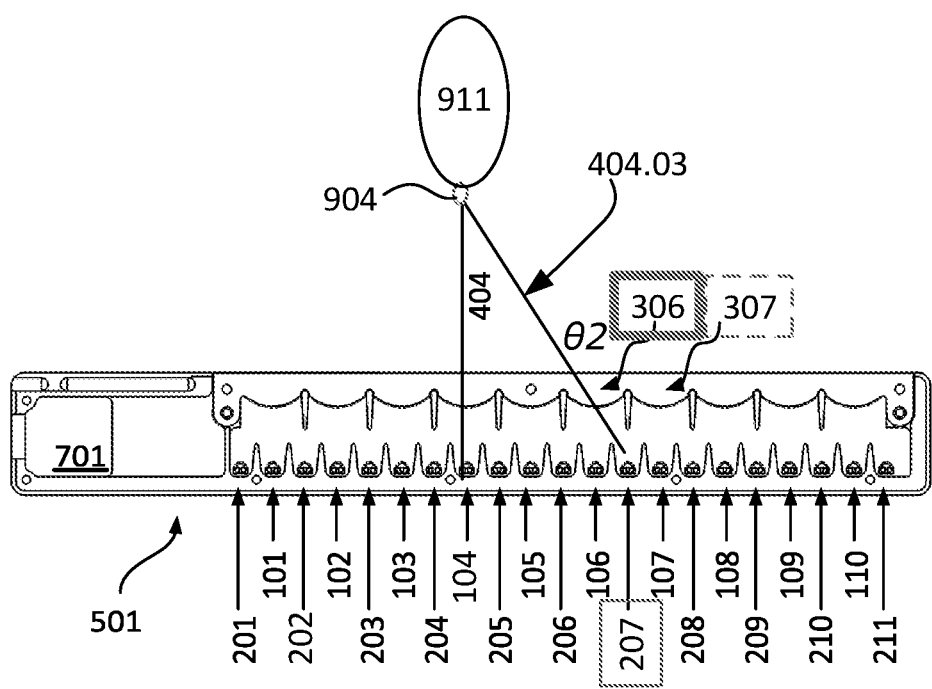
FIGS. 6-9 are simplified illustrations of a proximity sensor, in accordance with an embodiment of the present invention.

FIG. 6 shows a forward reflection path of maximum detection 404.03 for hotspot 904 generated by emitter/detector pair 104/207, whereby light beam 404, from emitter 104, reflected off object 911 is maximally detected by sensor 207, as it reaches lens 306 at an angle of incidence θ2. The term "hotspot" refers to a location within a sub-area of the two-dimensional detection plane opposite proximity sensor 501 at which an object will generate reflections that are maximally detected at one or more detectors, in comparison to other locations within that sub-area or neighborhood.

Figure 7:
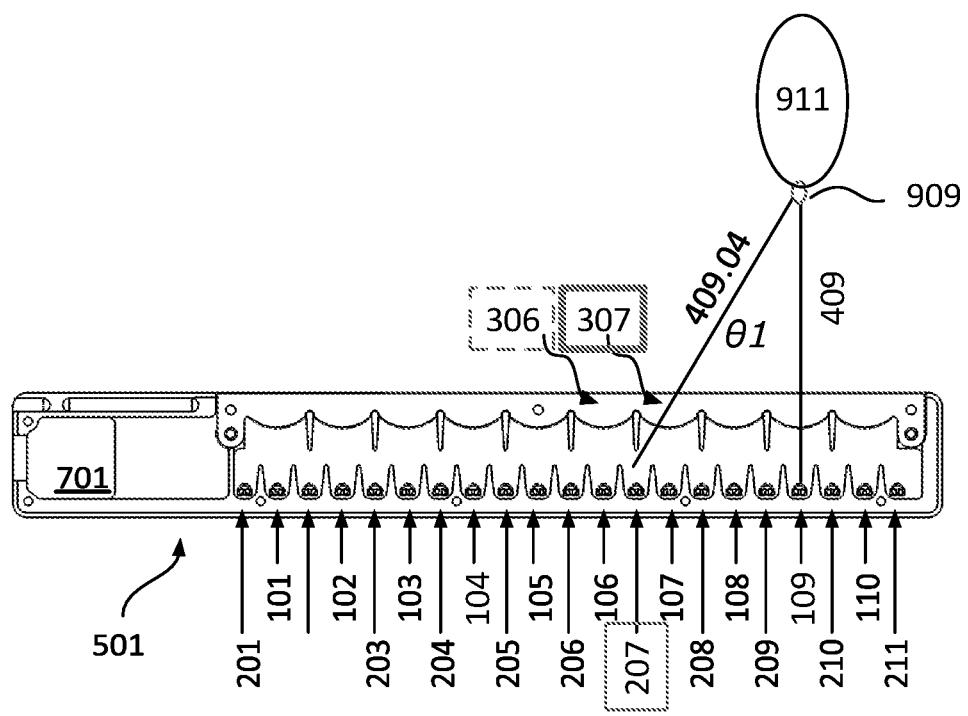

FIG. 7 shows a backward reflection path of maximum detection 409.04 for hotspot 909 generated by emitter/detector pair 109/207, whereby light beam 409, from emitter 109, reflected off object 911 is maximally detected by detector 207, as it reaches lens 307 at an angle of incidence θ1. FIGS. 6 and 7 show how detector 207 is situated with respect to neighboring lenses 306 and 307 such that detector 207 receives maximum forward reflection values at an angle of incidence θ1 via lens 306, and maximum backward reflection values at an angle of incidence θ2 via lens 307.

Figure 8:
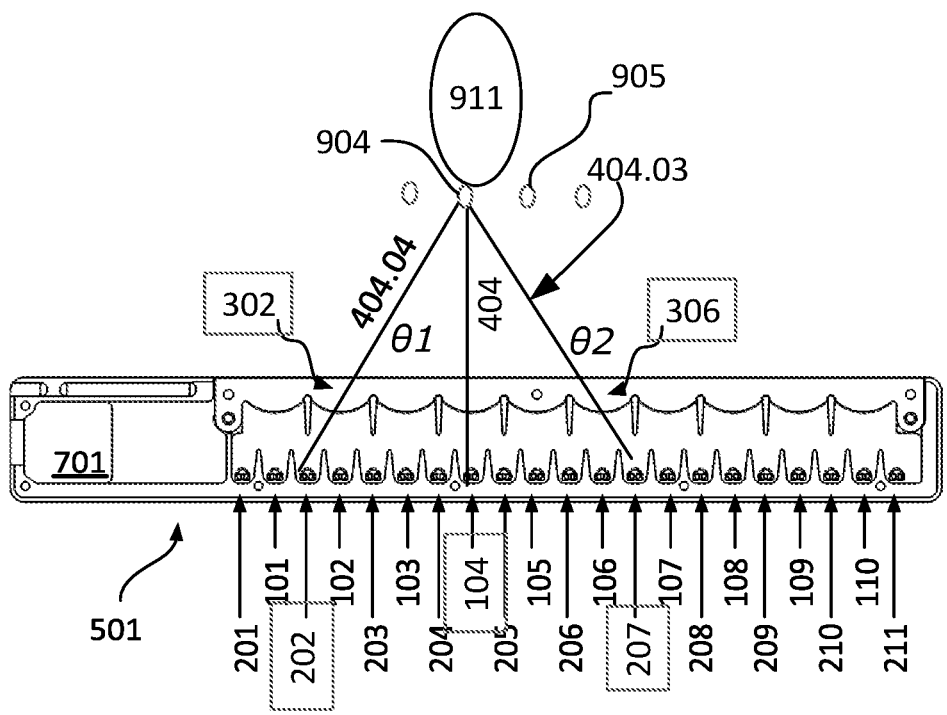
Figure 9:
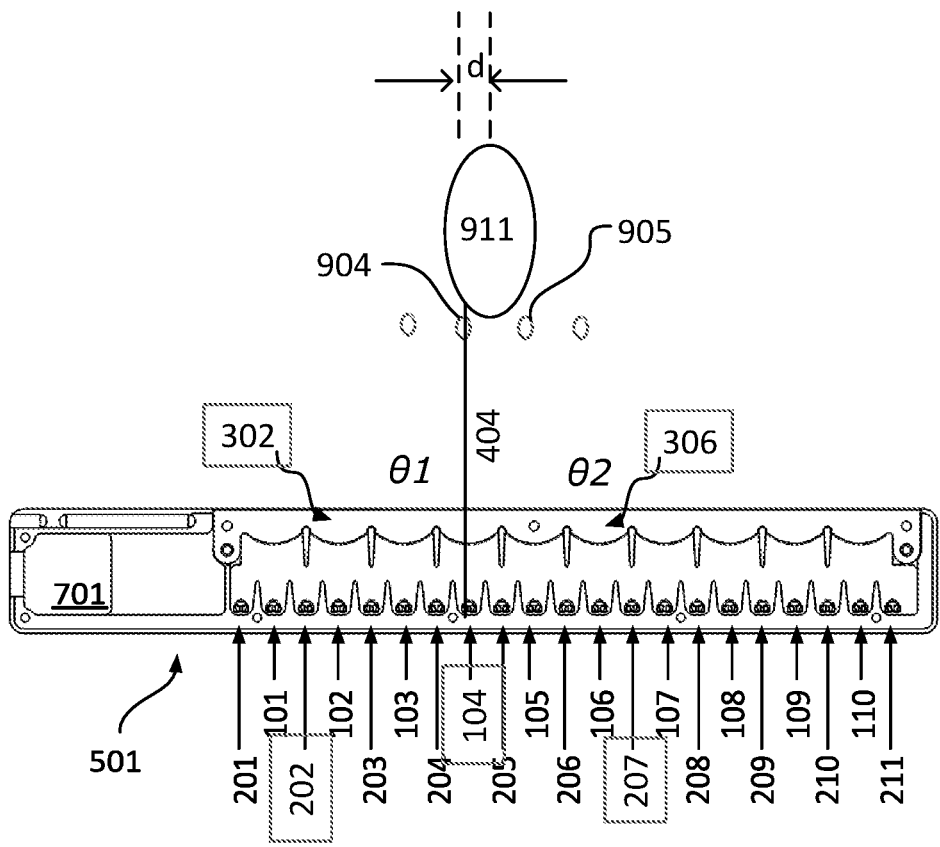

The intersections outside proximity sensor 501 between the projected light beams and the corridors of maximum detection provide a map of hotspots. Four hotspots are illustrated in FIGS. 8 and 9, two of which are numbed 904 and 905. Reflective object 911 is shown near hotspot 904 in FIG. 8. Thus, the maximum detection of object 911 is generated by emitter/detector pairs 104/202 and 104/207. Emitter/detector pair 104/202 provides backward detection 404.04, and emitter/detector pair 104/207 provides forward detection 404.03, as discussed above. Additional detections are generated by other emitter/detector pairs, e.g., forward detection emitter/detector pair 104/208, because light beams from emitter 104 are scattered by object 911, and a portion of the scattered light arrives at detector 208, but the amount of light detected at detector 208 is significantly less than that detected at detector 207, because the scattered light arriving at detector 208 does not travel along the corridor of maximum detection, i.e., it does not reach lens 307 at an angle of incidence θ2.

In FIG. 9 object 911 is moved a distance d to the right, as compared to FIG. 8. In this case, similar detections are generated by forward emitter/detector pairs 104/207 and 105/208. Each of these detections is less than the detection generated by emitter/detector pair 104/207 in FIG. 8 and greater than the detection generated by emitter/detector pair 104/208 in FIG. 8. The location of object 911 between hotspots 904 and 905 is calculated by interpolating the coordinates of hotspots 904 and 905 according to the amounts of light detected by emitter/detector pairs 104/207 and 105/208, respectively.

Figure 10:
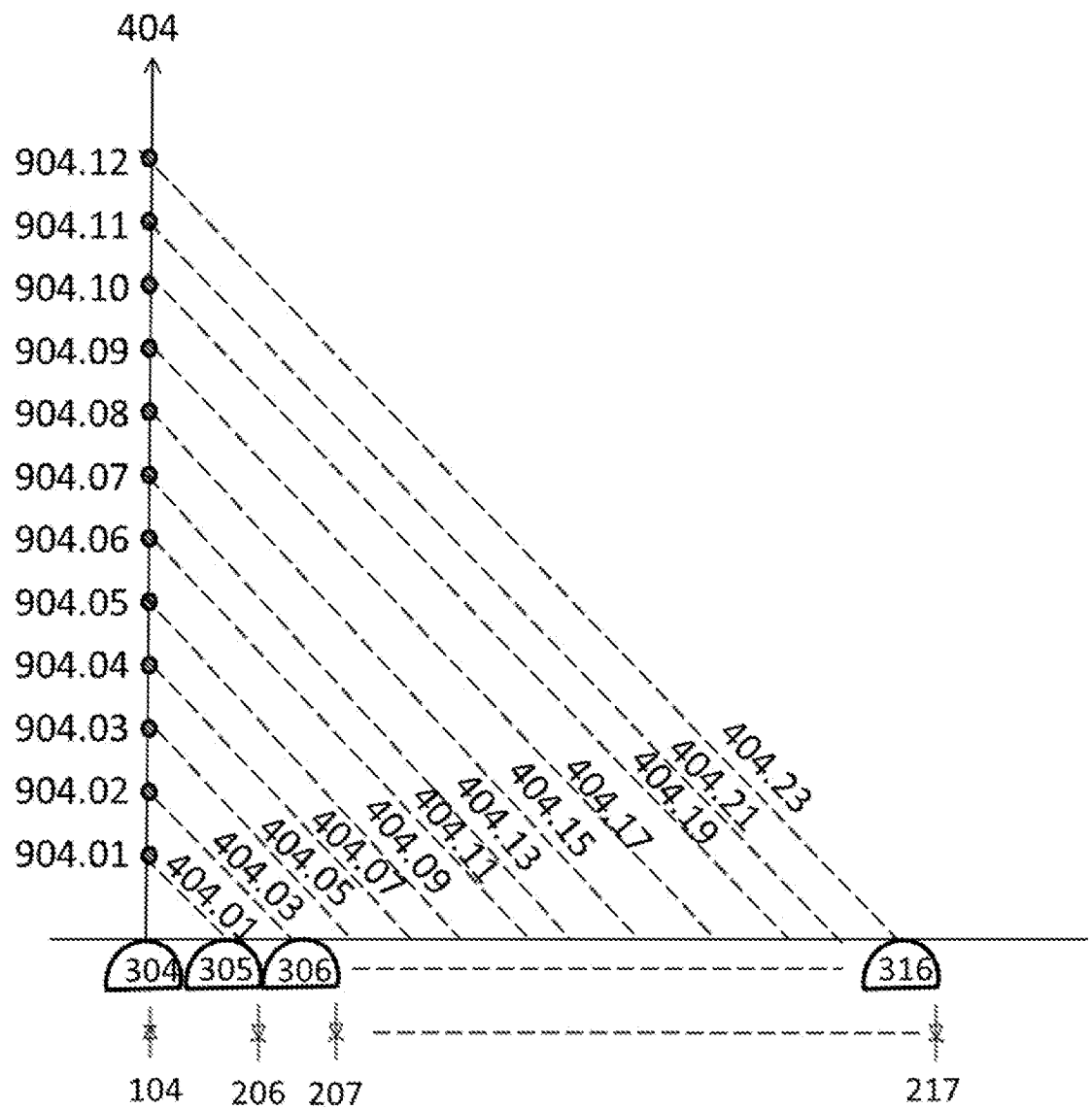
FIG. 10 is an illustration of maximum detected forward reflections for a single emitter beam in a proximity sensor, in accordance with an embodiment of the present invention.

Reference is made to FIG. 10, which is an illustration of maximum detected forward reflections 404.01-404.23 for a single emitter beam 404 in a proximity sensor 501, in accordance with an embodiment of the present invention. In this specification, reflections of an emitter beam n are numbered n.xy where the number xy after the decimal point is odd for forward reflections and even for backward reflections. Each maximal detected reflection is detected at a respective detector 206-217, through a corresponding lens 305-316. A reflective object placed somewhere along the path of emitter beam 404 will generate detection signals at several of the receivers, forming a pattern. The object's position along beam 404 is calculated by calculating an estimated axis of symmetry within the detector output pattern, orienting the axis of symmetry by θ, and finding its intersection with the path of emitted light beam 404. FIG. 10 shows 12 hotspot locations 904.01-904.12 along beam 404.

Because the detectors receive light from many angles, it is important to remove those signals that are largely unrelated to the path of maximum detection from the calculation. It has been found that four or five signals around the maximum signal are useful for calculating the object location. However, this number of neighbors is to be taken as an example, and other numbers of neighbors may be used.

Figure 11:
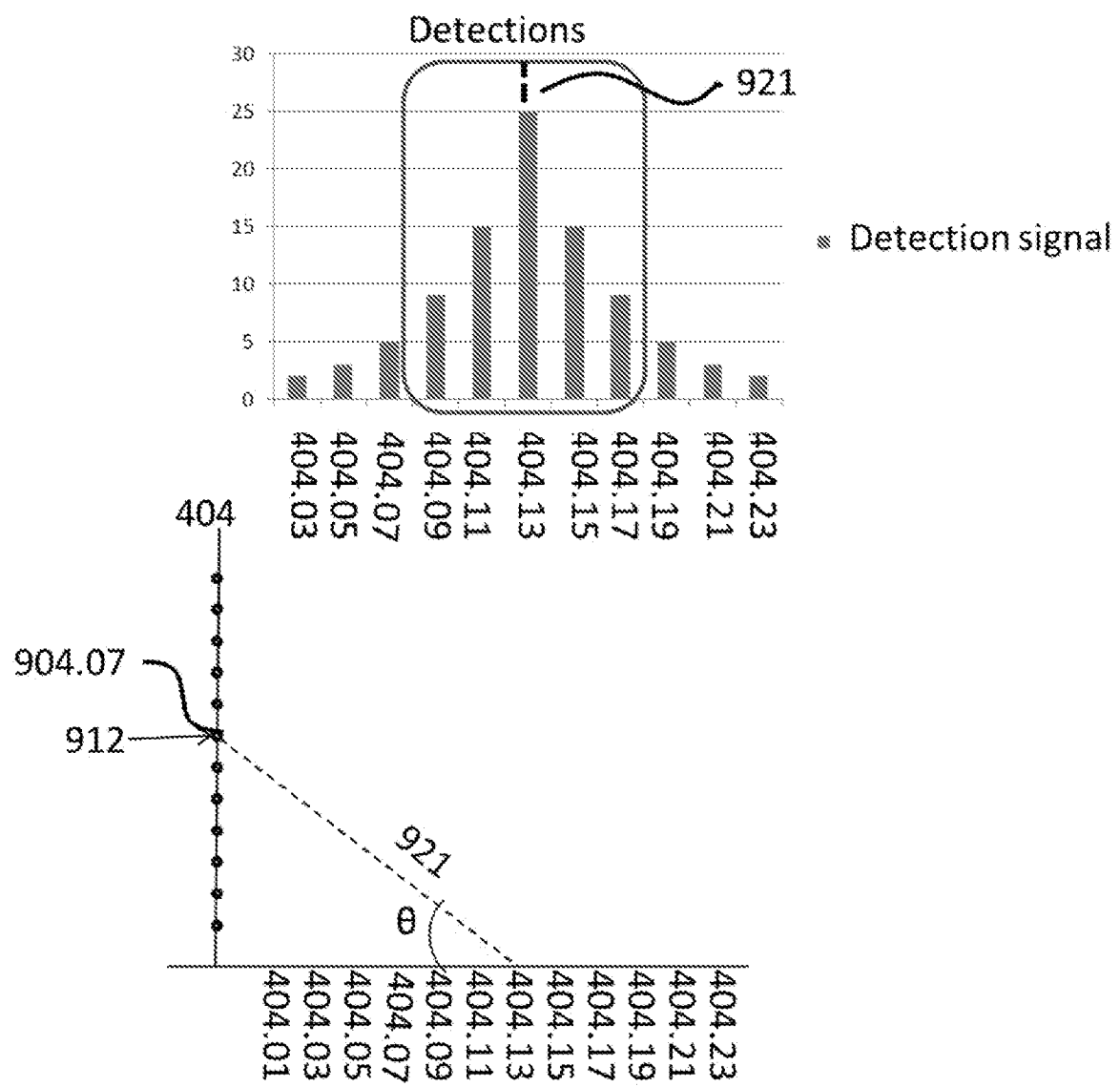
FIG. 11 is a simplified illustration of a first scenario in which there is a single maximum detection signal corresponding to a reflection beam, in accordance with an embodiment of the present invention.

Reference is made to FIG. 11, which is a simplified illustration of a first scenario in which there is a single maximum detection signal corresponding to reflection beam 404.13, in accordance with an embodiment of the present invention. The top half of the figure shows the detection signals at each of the detectors, each detector corresponding to a respective one of the forward reflections 404.01-404.23. In this case, five detection signals are used: two neighbors on either side of the maximum, namely, the detections corresponding to forward reflections 404.09-404.17. These signals are surrounded by a rectangle with rounded corners in FIG. 11. One method for calculating the axis of symmetry is to assign a respective coordinate, along the length of proximity sensor 501, to each detection signal. An axis of symmetry is found by calculating a weighted average of the coordinates, each coordinate's weight corresponding to its detection signal. Dashed line 921 indicates the resulting calculated axis of symmetry. Orienting the axis of symmetry by θ, and finding its intersection with the path of emitted light beam 404 provides the estimated location 912 of object 911 at hotspot 904.07, as illustrated in the bottom half of FIG. 11. Processor 701 calculates the object's location. Alternatively, the detection signals are output to an external processor, e.g., a host PC, and the object's location is calculated by the external processor.

Figure 12:
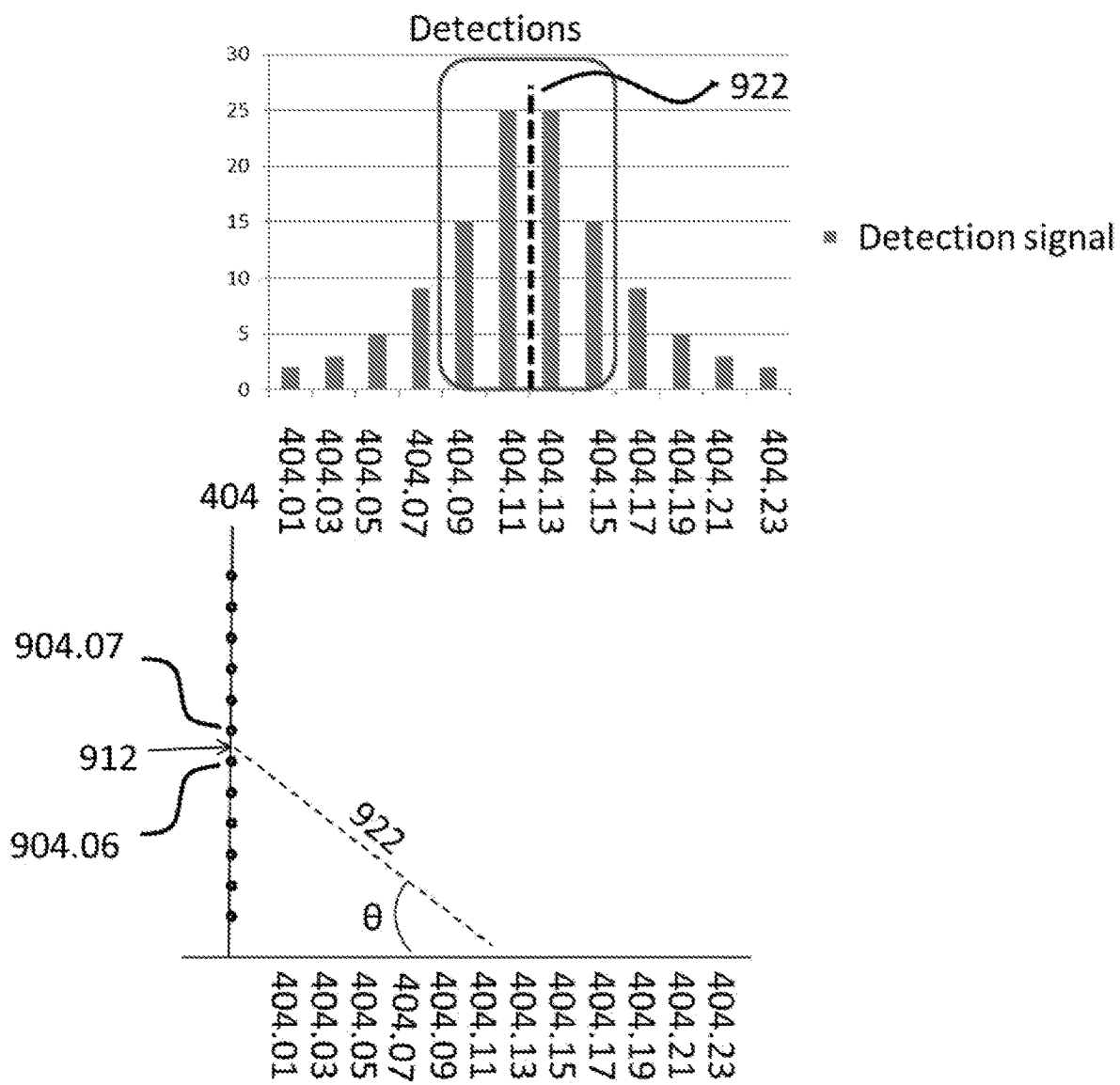
FIG. 12 is a simplified illustration of a second scenario in which there are two maximum detection signals corresponding to reflection beams, indicating that the maximum reflection is probably between these two reflection beams, in accordance with an embodiment of the present invention.

Reference is made to FIG. 12, which is a simplified illustration of a second scenario in which there are two maximum detection signals corresponding to reflection beams 404.11 and 404.13, indicating that the maximum reflection is probably between these two reflection beams, in accordance with an embodiment of the present invention. The upper half of the figure shows the detection signals at each of the detectors, each detector corresponding to a respective one of the forward reflections 404.01-404.23. In this case, four detection signals are used; namely, the two maxima and their neighbors, corresponding to forward reflections 404.09-404.15. These signals are surrounded by a curved rectangle in FIG. 12. Dashed line 922 indicates the axis of symmetry calculated by the same method discussed hereinabove with respect to FIG. 11, but using only four detection signals. Orienting the axis of symmetry by θ, and finding its intersection with the path of emitted light beam 404 provides the estimated location 912 of object 911 midway between hotspots 904.06 and 904.07, as illustrated in the bottom half of FIG. 12.

If every case in which there is a single maximum detection signal would be processed like the case shown in FIG. 11, namely, using five detection signals in the neighborhood of the maximum to calculate the axis of symmetry, then when an object moves between neighboring hotspots along beam 404, and it transitions from the state shown in FIG. 11, to that shown in FIG. 12, there will be a sudden jerk in the object's calculated location when different signals are used to calculate the axis of symmetry, namely, when four signals are used instead of five. In order to avoid these jerky movements, the transition between the states shown in FIGS. 11 and 12 is gradual, in accordance with an embodiment of the present invention. This gradual change is done by calculating a degree to which the current distribution of detection signals is similar to that of FIG. 11 and including the fifth, outermost detection signal in proportion to that degree of similarity.

This process uses two values: SingleMax and DoubleMax. SingleMax represents the degree to which the distribution is evenly distributed around a single maximum, and DoubleMax represents the degree to which the distribution is evenly distributed around two, adjacent maximum signals. Specifically, SingleMax is the magnitude of difference between (a) the sum of all signals left of the maximum, and (b) the sum of all signals right of the maximum. The central maximum itself is not included in the SingleMax calculation. For the DoubleMax calculation, the signals are divided into two groups whose dividing line lies between the two largest signals. DoubleMax is the magnitude of difference between (c) the sum of all signals in the left group, and (d) the sum of all signals in the right group.

As mentioned hereinabove, in cases of a single maximum value, an uneven number (2n+1) of signals is used to determine the axis of symmetry (n neighbors on either side of the maximum, and the maximum), whereas in cases of two adjacent maximum values, a smaller, even number (2n) of signals is used to determine the axis of symmetry (left n neighbors and right n neighbors, which include the maximum signals). In this process, the extra signal is used in proportion to the degree that the distribution is similar to the single maximum case. One score for this similarity is:

$$\text{similarity} = \frac{\text{DoubleMax}}{(\text{SingleMax} + \text{DoubleMax})}$$

Note that in the case of an even distribution around two neighboring maxima, the sum of all signals on the left equals the sum of an equal number of signals on the right, and thus, DoubleMax=0, and similarity=0.

Conversely, in the case of an even distribution around a single maximum, the sum of all signals left of the maximum equals the sum of an equal number of signals right of the maximum, and thus, SingleMax = 0, and $$\text{similarity} = \frac{\text{DoubleMax}}{(0 + \text{DoubleMax})} = 1.$$

Figure 13:
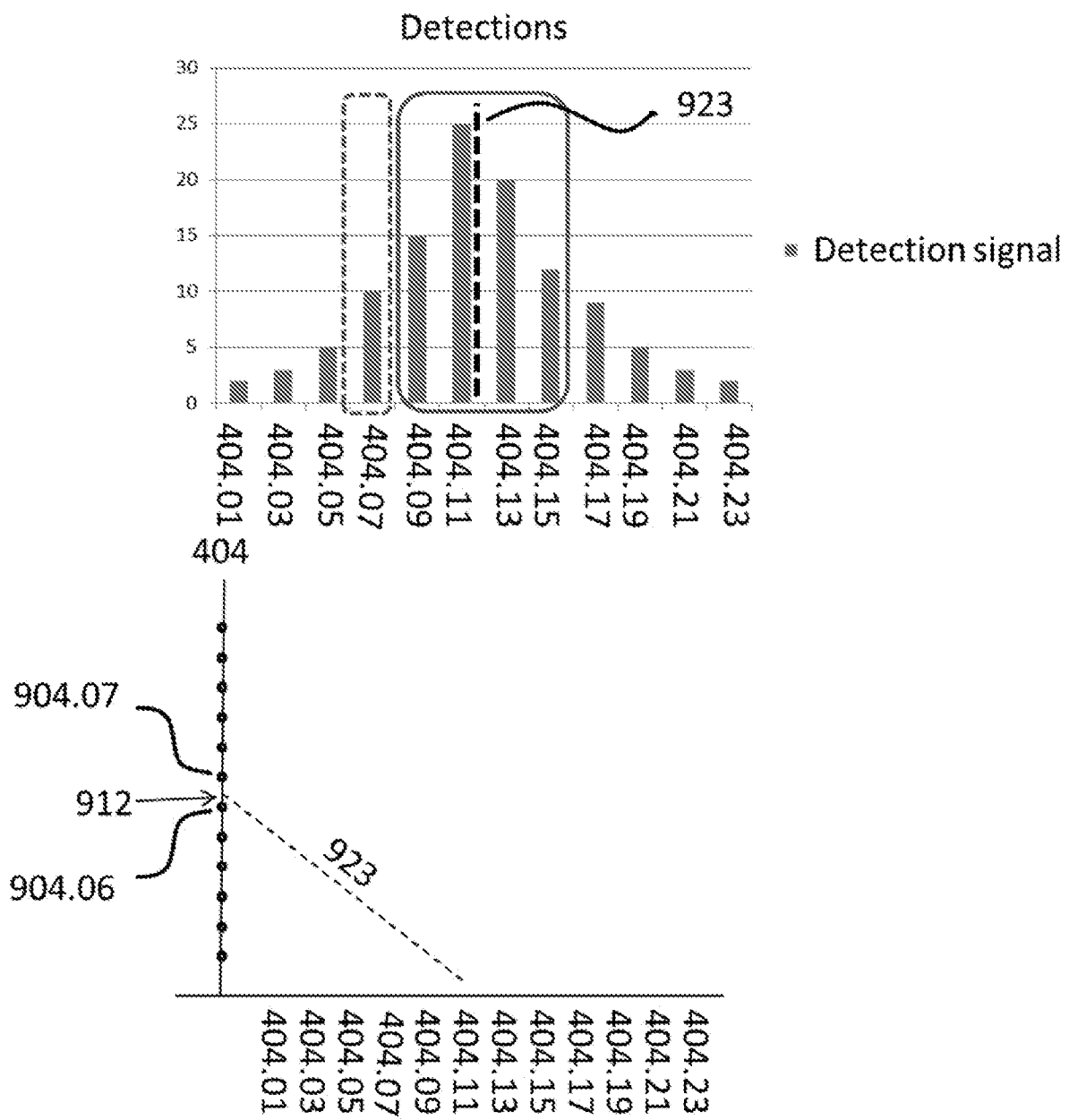
FIG. 13 is a simplified illustration of a method for calculating a degree to which a current distribution of detection signals is similar to a pattern of detected reflection signals generated when an object is inserted into the path of a projected light beam, in accordance with an embodiment of the present invention.

Reference is made to FIG. 13, which is a simplified illustration of a method for calculating a degree to which a current distribution of detection signals is similar to a pattern of detected reflection signals generated when an object is inserted into the path of a projected light beam, in accordance with an embodiment of the present invention. The upper half of FIG. 13 illustrates a scenario in which there is a single maximum detection signal surrounded by an uneven distribution of the surrounding detection signals: detection signal 404.13 is greater than detection signal 404.09 and detection signal 404.15 is greater than detection signal 404.07. In this case the four highest detection signals 404.09-404.15 are used together with a partial contribution of detection signal 404.07. As discussed hereinabove, the partial contribution (404.07') for detection signal 404.07 in the weighted average is:

$$404.07' = \frac{404.07 * \text{DoubleMax}}{(\text{SingleMax} + \text{DoubleMax})},$$

where

SingleMax=Abs((404.07+404.09)−(404.013+ 404.15)), and

DoubleMax=Abs((404.09+404.11)−(404.13+404.15)).

Dashed line 923 in FIG. 13 indicates the resulting calculated axis of symmetry. Orienting the axis of symmetry by θ, and finding its intersection with the path of emitted light beam 404 provides the estimated location 912 of object 911 between hotspots 904.06 and 904.07, but nearer to hotspot 904.06, as illustrated in the bottom half of FIG. 13.

Because the similarity score calculation handles the extreme cases of perfect single maximum (similarity=1) and perfect double maximum (similarity=0), in all cases the axis of symmetry is calculated by calculating a weighted average based on an even number of signals (e.g., four signals) in the neighborhood of the maximum and adding an additional signal, further from the maximum, in proportion to the detection pattern similarity score.

According to an alternative method, a first axis of symmetry is calculated using an odd number of signals, as in the case of a single maximum, and a second axis of symmetry is calculated using an even number of signals, as in the case of a double maximum. A weighted sum of the two axes is calculated using the same similarity score discussed hereinabove.

When detecting a highly reflective object with the proximity sensor of the present invention, e.g., a shiny metal object, there can be a very large difference between the maximum detection signal and its neighbors. This can cause inaccuracies when calculating the axis of symmetry in the manner discussed hereinabove. Therefore, in some embodiments, the maximum detection signal is capped at a multiple of its neighboring signals, e.g., 2× of its immediate right or left neighbor. This capping of the maximum may be implemented differently for cases of a single maximum and double maximum. For example, in the double maximum case, the two, central maximum values are capped at a multiple of their outer neighbors. This difference between the single maximum and double maximum cases in how exceptional values are capped will affect the method that involves calculating two axes of symmetry. Thus, when calculating the axis of symmetry for the single maximum type of distribution, only the central signal is capped, based on its immediate neighbors; whereas, when calculating the axis of symmetry for the double maximum type of distribution, the two central signals are capped, based on their outer neighbors.

As discussed hereinabove, a touch location is calculated based on reflection signals that correspond to several hotspots. The following configuration parameters are used to calculate a touch position: (i) signal intensity, (ii) hotspot x- and y-coordinate positions, (iii) intensity relationship between hotspots, and (iv) electrical noise of the system. An explanation of these parameters is presented below together with methods for determining values for each parameter.

In order to be able to combine signals from different hotspots, the signal received from all hotspots should be proportional to the object size. This creates a need to normalize the signals. The signal intensity parameter is thus a normalization factor, also referred to as "gain", indicating how much the raw photodiode detection signal is amplified. Hotspot x- and y-coordinate positions need to be precisely known in order to calculate the touch location as described hereinabove. The intensity relationship between hotspots parameter enables the position calculation to take into account systematic intensity differences between neighboring hotspot locations in both x and y directions and their relationship. The electrical noise parameter is used for making minor adjustments in filter characteristics in the calculations, based on noise in the sensor.

Figure 14:
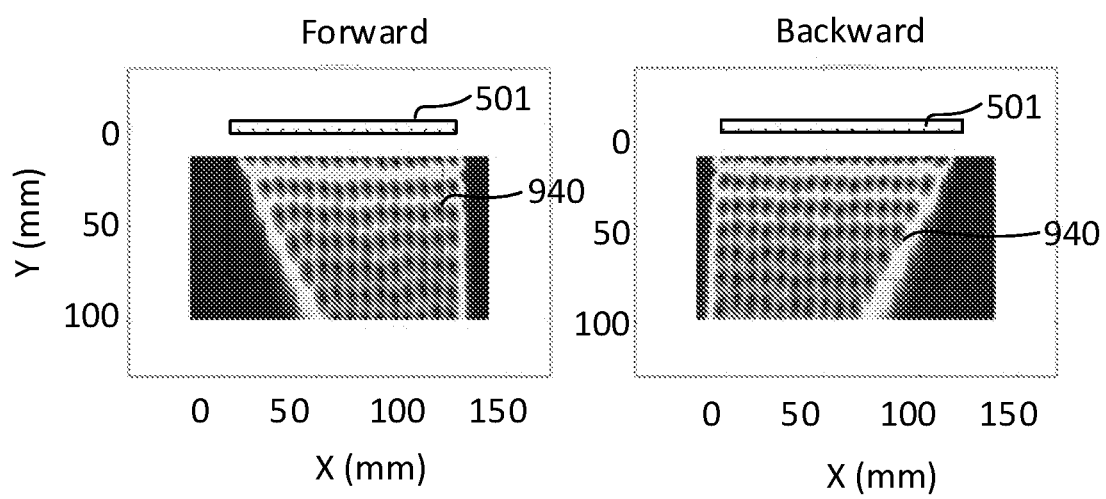
FIG. 14 is a simplified illustration of a plurality of hotspots in a detection area adjacent a calibrated proximity sensor, in accordance with an embodiment of the present invention.

Reference is made to FIG. 14, which is a simplified illustration of a plurality of hotspots in a detection area adjacent to a calibrated proximity sensor, in accordance with an embodiment of the present invention. FIG. 14 shows hotspot maximum detection locations for a calibrated system as a heat map where maximum detection locations in each neighborhood are marked with a black spot and their relative strengths are normalized. Note the variations in position between neighboring hotspots in both x and y directions.

The four configuration parameters are calculated by placing each sensor module into an apparatus that moves a reflective object throughout the detection plane in front of the sensor module and enables correlating detections on the sensor with objects at known locations within the detection plane. In some embodiments, the reflective object is a stylus shaped like a finger and painted gray or skin color in order to have a reflection that is similar to a finger. In other embodiments a flat spatula, spanning the width of the sensor module is used. When using a stylus the calibration test bed needs to move the stylus in both x and y directions, whereas, when using a long spatula the calibration test bed needs to move the spatula only in the y direction. In some embodiments the spatula is moved a fixed distance at each iteration, and the reflection signals are measured at each location. In other embodiments the spatula moves continuously and the reflection signals are measured throughout the movement.

A signal intensity parameter is calculated for each hotspot during calibration on the test bed and written to flash memory on the sensor module for use during calculation. One formula for calculating this parameter is $$\text{gain}_{signal\ i} = \text{gainRef} * \frac{\text{gainFactor[rowIndex]}}{\text{Signal}_i\ \text{max} - \text{Signal}_i\ \text{min}}$$

where gainRef is the normalization peak target, gainFactor is an adjustment factor for the reflectance of the flat calibration spatula used in the test bed compared to the reflectance of a cylindrical finger. This factor is different from row to row. $\text{Signal}_i$ max and $\text{Signal}_i$ min are the maximum and minimum values in the neighborhood surrounding a specific hotspot, defined by the row it is in (rowIndex) and that hotspot's position (i) within that row. $\text{Signal}_i$ min values are collected by taking the median value of a series of samples taken for each hotspot in a row when the calibration spatula enters a row of hotspots. Typically, for hotspots near the sensor, the minimum signal is at that portion of the hotspot neighborhood closest to the sensor, whereas for hotspots farther from the sensor, the minimum signal is at that portion of the hotspot neighborhood farthest from the sensor.

The gain factor needs to be calibrated since the strength of the emitters and the sensitivity of photodiode (PD) detectors may vary widely among similar components. Light guide quality, emitter/PD placement, and semiconductor placement within the emitter and PD components are other factors that affect signal intensity.

Figure 15:
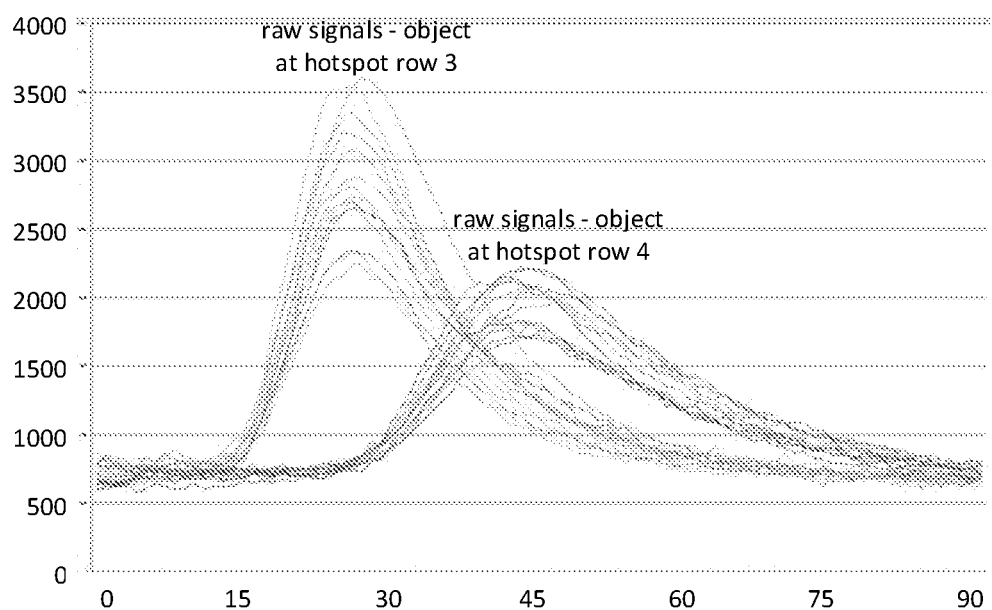
FIG. 15 is a simplified illustration of raw data signals from a proximity sensor, in accordance with an embodiment of the present invention.

Reference is made to FIG. 15, which is a simplified illustration of raw data signals from a proximity sensor, in accordance with an embodiment of the present invention. FIG. 15 shows a collection of raw data signals from objects at hotspot rows 3 and 4 before normalization. The x axis represents the distance from the sensor light guide edge in millimeters, and the y axis represents detection signal amplitude. FIG. 15 illustrates that detection signals generated by an object at a location nearer to the light guide are larger than those generated by that object at a location further from the light guide.

Figure 16:
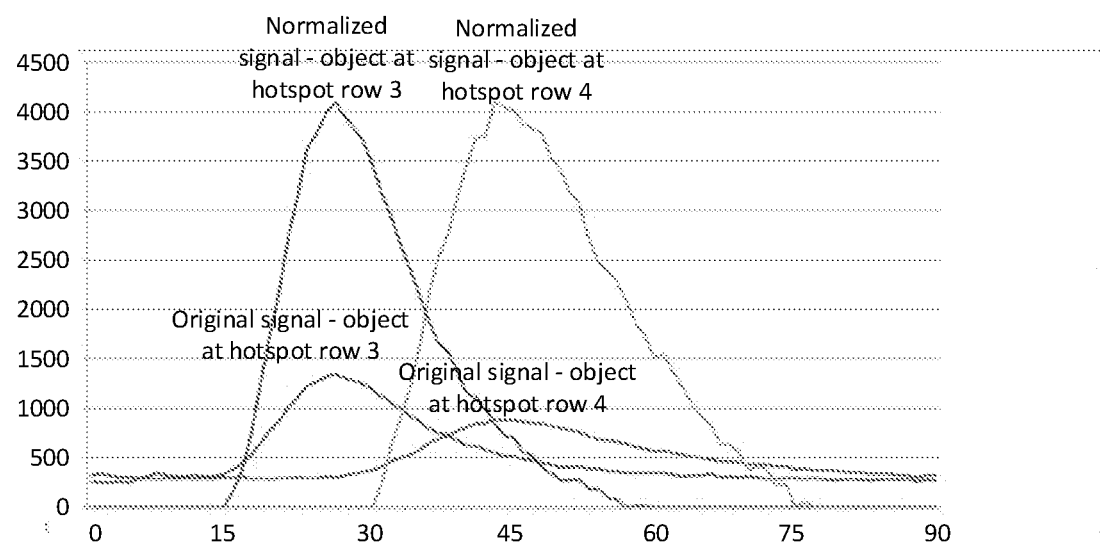
FIG. 16 is a simplified illustration of signals from a proximity sensor, before and after normalization, in accordance with an embodiment of the present invention.

Reference is made to FIG. 16, which is a simplified illustration of signals from a proximity sensor, before and after normalization, in accordance with an embodiment of the present invention. FIG. 16 shows signals from objects at hotspot rows 3 and 4 before and after normalization. The x axis represents the distance from the sensor light guide edge in millimeters, and the y axis represents detection signal amplitude. FIG. 16 shows that the normalized signals accentuate the maximal reflections and normalize the signals from objects at different distances from the sensor light guide to be in the same range of values.

Every hotspot is mapped to x and y coordinates in the sensor detection plane during calibration and this table of coordinates is stored to flash memory on the sensor for use when calculating object locations. The hotspot detection works by first collecting data when the calibration spatula or stylus moves over the active area. All samples that belong to a certain hotspot are stored in the calibration software along with the position, in millimeters, of the calibration spatula or stylus from the sensor. The data is filtered to remove noise disturbances. The filter used depends on the collection method of the samples. If a continuous movement of the robot arm is used, the filter is a moving average filter with a small sample window, e.g., a 3-5 sample window, depending on robot arm speed. If the raw data is collected using a step-based collection method where the calibration spatula or stylus stops at each position and collects several samples, a median filter is applied for all samples at the same location.

The largest value of the filtered data is found in the list of samples. When the peak has been found a number of samples in the neighborhood around the peak are used as input to a curve adapting function. The maximum of the curve is then set as the y position of the hotspot.

Figure 17:
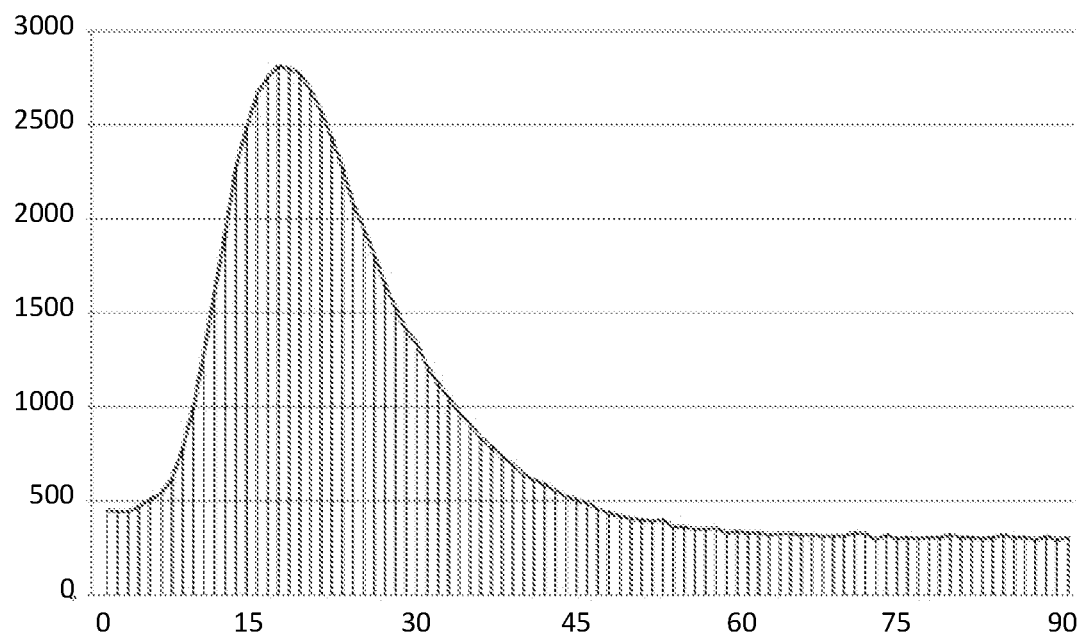
FIG. 17 is a simplified illustration of filtered signals from a proximity sensor detecting an object in the sensor's detection area, in accordance with an embodiment of the present invention.

Reference is made to FIG. 17, which is a simplified illustration of filtered signals from a proximity sensor detecting an object in the sensor's detection area, in accordance with an embodiment of the present invention. FIG. 17 shows filtered samples for one hotspot after calibration. The x axis represents the distance from the sensor light guide edge in millimeters, and the y axis represents detection signal amplitude. A signal maximum is detected around 19 mm from the light guide.

The thus calculated x and y positions for each hotspot are adjusted by a scaling factor that adjusts the peak position slightly to adjust for a slight difference between the locations that generate maximum reflection for the flat, calibration spatula and the cylindrical, stylus reference object. This scaling factor is dependent on the distance from the light guide, resulting in a different factor for each row of hotspots.

The y values are then used to calculate the x positions based on geometrical properties of component placement like LED/PD placement and pitch between components. The adjustments in x positions are generally much smaller than the adjustments in y positions.

No assumptions are made as to where the peak y positions are located. The calibration process records data that is outside the expected range and then calculates each peak individually. The validation of the detected peak location is done at a later stage.

The hotspot positions need to be calibrated since they vary from device to device depending on light guide quality, emitter/PD placement, semiconductor placement inside the emitter and PD components and other factors.

The average noise for each hotspot row is written to the MCU flash memory. The noise for each hotspot row is used by the controller or processor firmware calculating object locations to tune an Infinite Impulse Response (IIR) filter used for noise reduction, in order to set the filtering at a level that is not too high on devices having a low noise level.

Noise samples are collected, for each hotspot row, when the calibration spatula is at the position, associated with that row, furthest from the light guide. The noise is estimated by taking the median of the absolute deviation from the median of the data for each hotspot signal that belongs to one row (MAD value). Different emitter and PD components, and different controllers, have different values of electrical noise.

Discussion now turns to the calibration process. During calibration, the minimum and maximum signal values for each hotspot are output to a calibration log for gain calculation. These minimum and maximum signal values are also used to set a baseline for how a functioning system should behave, whereby, a minimum or maximum value outside the expected performance spread, indicates the need for further examination. If any signal is large enough to saturate the ADC, this information is output to the log since it will affect the normalization and impair detection accuracy.

During calibration, the detected x and y positions for each hotspot are output into the calibration log. These positions use the position of first emitter as the x origin and the light guide outer edge as the y origin. This data is used to set a baseline for how a functioning system should behave. A range for each hotspot position is also provided, namely, the difference between the detected and expected x and y positions for each hotspot.

During calibration, a PD noise value is estimated for each PD by taking the median of the absolute deviation from the median of the data for all signals output by one PD. This PD noise value identifies PD components that exhibit a higher noise than the population does on average, indicating that the PD, or the PD receiver port on the controller, may be defective.

During calibration, a component functional test is performed to determine that the maximum signal associated with a particular emitter or PD component is at least a threshold magnitude greater than the minimum signal associated with that component:

$$\text{signal increase \%} = \frac{\text{signal}_i \text{ max}}{\text{signal}_i \text{ min}} \geq \text{component test threshold}$$

If signal increase values associated with a given component are below the threshold, that component is marked as having failed the component functional test. The log file contains a list of all components that failed the component functional test.

During calibration, the deviation in gain factor for all components with respect to all hotspots on a single row is output to the calibration log. The deviation in a perfect system should be 1 since all components would be equally strong on each row. A large deviation indicates that the device is faulty.

The calibration log file stores a component displacement error (xPos and yPos) for each emitter and PD component, that represents an estimated displacement of that component within the sensor module, based on the results of hotspot x and y positions identified during calibration.

This section describes the pass/fail calibration values and which settings are possible to change from the configuration file to modify the calibration pass/fail testing. A failed calibration is not written to flash and the reason of the fail is written to the calibration log file.

It is possible to set the maximum allowed gain scaling factor for each row. If the gain factor is greater than the maximum allowed gain, indicating a weak signal, the firmware will not be able to normalize the signal amplitude correctly. Thus, if the gain is larger than the maximum allowed gain, calibration fails. Gain for each hotspot row inside the detection area, namely, hotspot rows 1 thru outermost_row-1, should not reach the maximum value to make sure that there is sufficient signal for proper normalization. However, a high gain value at the outermost row of hotspots, which is used for interpolation with other hotspots, but is outside the active touch area, does not cause the device to fail.

All hotspot y-positions are validated against a range of possible values. If the hotspot y-position is outside the range, calibration fails. The default range is a simulated hotspot maximum shift from its expected position based on an optical simulation of component tolerances. The expected position is determined based on measurements taken from a large set of devices.

If the PD noise is outside a set range, calibration fails. Emitter noise is not as critical and is much less sensitive. If the component gain deviation value is greater than its threshold, the calibration fails. If the xPos and yPos are outside their thresholds, the calibration fails.

Figure 18:
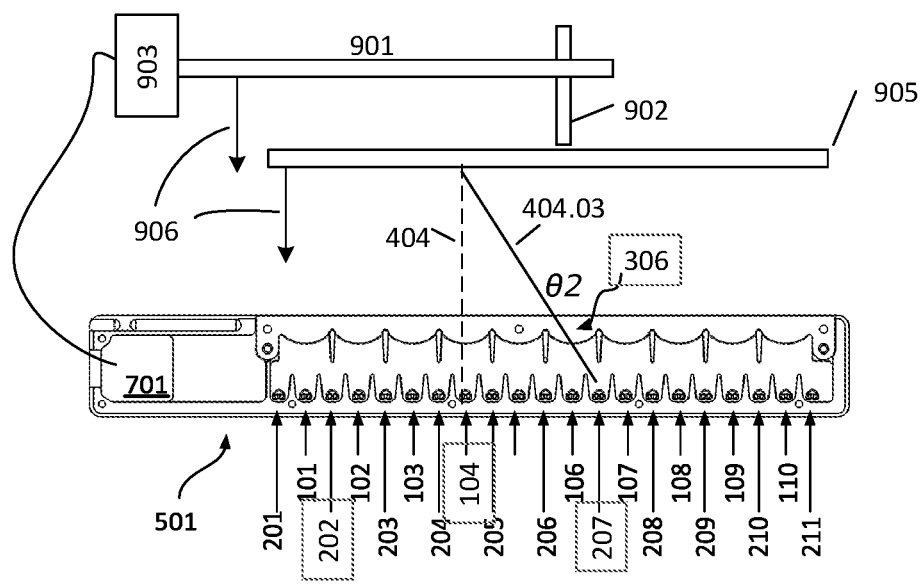
FIG. 18 is a simplified illustration of a calibration tool for a proximity sensor, in accordance with an embodiment of the present invention.

Reference is made to FIG. 18, which is a simplified illustration of a calibration tool for a proximity sensor, in accordance with an embodiment of the present invention. FIG. 18 shows a motor 903 and shafts 901 and 902 that move reflective calibration object 905, a flat reflective spatula, vertically in relation to proximity sensor bar 501, as indicated by arrows 906. At each location at which object 905 is placed, a plurality of source/sensor pairs that correspond to hotspots in the vicinity of that location are activated and the amounts of light detected are used to determine the sensitivity in the vicinity of those hotspots. Multiple such source/sensor pairs that share a common light source are activated simultaneously.

There are two different methods to operate the calibration tool of FIG. 18. According to one method, calibration object 905 is moved continuously by motor 903 according to arrows 906 and samples are continuously collected throughout this movement. According to another method, motor 903 stops movement of object 905 at predefined locations along the path indicated by arrows 906, and a series of samples is collected at each step.

When starting the calibration, a configuration file with all the settings used is loaded into the calibration program. This file is human readable and can be edited using a text editor. Most, if not all, of the parameters that control the calibration can be edited there. Some settings are more important than others. This section goes through all the possible settings and what they do. All data in the configuration file that is a range of values means that there are separate values for each row of hotspots. The table below lists the parameters in this configuration file.

| Parameter | Setting | Description |
| --- | --- | --- |
| iteration Count | | Sets the number of samples collected at each position the calibration bar stops at. Increasing this value increases the calibration time but more samples are collected for filtering noise. Not used for continousSweep calibration. |
| version | | Version number is printed to calibration log. |
| calibrationSteps | relativeOffset | Sets the midpoint of the interval used when collecting samples for calibration. Calibration flow uses two intervals. One is the calibration interval and the second is the location where minimum values are collected at the position closest to the light guide. Change relativeOffset if the midpoint for calibration should be changed. Value is in mm based on the calibration tool origin position. |
| | range | Defines the range from the relativeOffset that samples are collected in. The midpoint +−range/2 defines the total range. Value is in mm length. |
| | sampleCount | Number of samples collected in the interval. 1-2 mm steps are recommended. Not used for continousSweep calibration. |
| | direction | Direction calibration bar 905 should move when calibrating compared to calibration tool coordinate system. |
| | minRelativeOffset maxRelativeOffset | Calculated movement limits depending on relativeOffset and range. |
| | continousSweep | If true, the calibration is done in a continousSweep instead of using step-based calibration. |

| Parameter | Setting | Description |
|---|---|---|
| ValidationConfiguration | name | Name of calibration settings. |
| | noiseLimit | Limit used for Pass/Fail criteria of noise. |
| | ledXLimit | Limit used for Pass/Fail criteria of emitter component displacement test (x direction). |
| | pdXLimit | Limit used for Pass/Fail criteria of PD component displacement test (x direction). |
| | pdYLimit | Limit used for Pass/Fail criteria of PD component displacement test (y direction). |
| | pdDeviation | Limit used for Pass/Fail criteria of PD gain deviation. |
| | led Deviation | Limit used for Pass/Fail criteria of emitter gain deviation. |
| | gainFactor | Limit used for gainFactor adjustment for each hotspot row in firmware. gainFactor translates the reflection of calibration bar 905 compared to that of a cylindrical reference object similar to a finger. |
| | hotspotYMin | Limit used for Pass/Fail testing of hotspot y-position. Value is in mm with sensor light guide as origin. Detected hotspot position outside range will cause calibration to fail. |
| | hotspotYMax | Limit used for Pass/Fail testing of hotspot y-position. Value is in mm with sensor light guide as origin. Detected hotspot position outside range will cause calibration to fail. |
| | position FormatFactor | Scaling factor for translating coordinates |
| | componentLocationRef | Default PD position used for calculating x positions. |
| | pdyDefaultPosition | Default PD position used for calculating y positions. |
| | pitchSize | Distance between components. |
| | maxGain | Expected max gain adjustment per hotspot row. |
| | maxGainLimit | Limit used for Pass/Fail criteria of gain calculation. |
| | forwardYAdaptOffset backwardYAdaptOffset | This parameter adjusts the detected hotspot y-position in mm. This is needed since the peak signal generated by the calibration tool bar and the peak signal generated by an elliptical object such as a finger will have different locations due to the different surface shapes of the objects. For example, −13 means that if the calibration bar maximum is found at mm 50.0 then the position will be adjusted to mm 48.7. |
| | robotSpeedLimit | When doing a continuous sweep calibration this is the maximum speed allowed for the robot movement. |
| | firstUsedRow | Instructs the calibration DLL which hotspot row the calibration starts to calibrate on. |
| | lastUsedRow | Instructs the calibration DLL which hotspot row the calibration finishes calibration on. |

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A user interface system comprising:
 a display presenting a plurality of graphical user interface (GUI) controls;
 an eye tracker operable to identify a GUI control that a user is gazing at, from among the plurality of GUI controls on said display;
 a gesture sensor operable to detect gestures, that are members of a group consisting of: slide gestures, sweep gestures and spread gestures, performed by the user;
 a processor connected to said display, said eye tracker and said gesture sensor; and
 a non-volatile storage medium storing instructions, which, when executed by said processor, cause said processor to (i) on condition that gestures detected by the gesture sensor are performed in an airspace away from the display, selectively combine outputs from said eye tracker and said gesture sensor, by applying the gestures to the GUI control identified by said eye tracker, and to (ii) on condition that the gestures detected by the gesture sensor are performed by the user touching the display, selectively ignore outputs from said eye tracker by applying the gestures to a GUI control presented at the touched display locations that is different than the GUI control identified by said eye tracker.

2. The user interface system of claim 1 wherein said gesture sensor and said eye tracker are housed in a common housing and activated by a shared controller.

3. The user interface system of claim 1 wherein said gesture sensor determines whether the gesture is performed by the user touching said display, or whether the gesture is performed away from said display, based on a detection plane in which the gesture is detected by said gesture sensor.

4. The user interface system of claim 1 wherein said gesture sensor determines whether the gesture is performed by the user touching said display, or whether the gesture is performed away from said display, based on a distance away from said display at which the gesture is detected.

5. The user interface system of claim 1 wherein the identified GUI control is a slider or a scroll bar.

* * * * *